(12) United States Patent
Weiss et al.

(10) Patent No.: US 8,828,173 B2
(45) Date of Patent: Sep. 9, 2014

(54) POLYSILOXANES WITH AMINO FUNCTIONALITIES HAVING REVERSIBLE THICKENING AND ADHESION PROPERTIES AND SYSTEMS AND METHODS FOR CRUDE OIL, PETROLEUM PRODUCT OR CHEMICAL SPILL CONTAINMENT AND REMEDIATION

(75) Inventors: Richard G Weiss, Bethesda, MD (US); Tao Yu, Pittsburgh, PA (US); Koji Wakuda, Osaka (JP)

(73) Assignee: Georgetown University, Washington, DC (US)

( * ) Notice: Subject to any disclaimer, the term of this patent is extended or adjusted under 35 U.S.C. 154(b) by 0 days.

(21) Appl. No.: 13/636,375

(22) PCT Filed: Mar. 22, 2011

(86) PCT No.: PCT/US2011/000524
§ 371 (c)(1),
(2), (4) Date: Oct. 26, 2012

(87) PCT Pub. No.: WO2011/119218
PCT Pub. Date: Sep. 29, 2011

(65) Prior Publication Data
US 2013/0056140 A1     Mar. 7, 2013

Related U.S. Application Data

(60) Provisional application No. 61/316,089, filed on Mar. 22, 2010, provisional application No. 61/376,964, filed on Aug. 25, 2010.

(51) Int. Cl.
| | |
|---|---|
| C08G 77/392 | (2006.01) |
| C09J 183/08 | (2006.01) |
| B32B 38/10 | (2006.01) |
| C08L 83/08 | (2006.01) |

(52) U.S. Cl.
USPC .................... 156/247; 525/474; 524/588

(58) Field of Classification Search
None
See application file for complete search history.

(56) References Cited

U.S. PATENT DOCUMENTS

| | | |
|---|---|---|
| 4,029,596 A | 6/1977 | Fink et al. |
| 5,061,773 A | 10/1991 | Panster et al. |

(Continued)

OTHER PUBLICATIONS

Yu et al. "Reversibly Cross-Linking Amino-Polysiloxanes by Simple Triatomic Molecules. Facile Methods for Tuning Thermal, Rheological, and Adhesive Properties" J. Phys. Chem. C 2009, 113, 11546-11553.*

(Continued)

*Primary Examiner* — Robert S Loewe
(74) *Attorney, Agent, or Firm* — Ratnerprestia

(57) ABSTRACT

Reversibly and irreversibly-linking amino-polysiloxanes, methods of making such amino-polysiloxanes, and systems and methods of using such amino-polysiloxanes for the containment and/or remediation of a release and/or spill of a crude oil, a petroleum product and/or a chemical is described. Gels and/or emulsions formed from the combination and/or contacting of such an amino-polysiloxane with these materials can be used to recover these oils or chemicals while allowing the amino-polysiloxane to be recovered and reused to clean up or contain additional materials. Such amino-polysiloxanes can be used as well for the selective uptake of one component of liquid mixtures when such mixtures contain more and less lipophilic components. Methods of making and using adhesive and sealants containing such amino-polysiloxanes are described. The adhesive and sealants can be used in a variety of applications to adhere and/or seal various materials including plastics, metals, glass, ceramics, paper, paper products, wood, and wood products.

17 Claims, 17 Drawing Sheets

Structures of Polysiloxane Samples and a General Scheme for Their Reactions with $CO_2$ and $CS_2$.

(56) References Cited

U.S. PATENT DOCUMENTS

| | | | |
|---|---|---|---|
| 5,856,544 A | | 1/1999 | Czech et al. |
| 2002/0017493 A1 | | 2/2002 | Ehrnsperger et al. |
| 2010/0154431 A1 | * | 6/2010 | Genovese et al. ............... 60/783 |
| 2010/0154639 A1 | * | 6/2010 | Perry et al. ..................... 95/236 |
| 2010/0158777 A1 | * | 6/2010 | Perry et al. ................... 423/230 |
| 2013/0052109 A1 | * | 2/2013 | Davis et al. ................... 423/220 |

OTHER PUBLICATIONS

International Search Report (PCT/ISA/210) issued on Jun. 3, 2011, by the U.S. Patent Office as the International Searching Authority for International Application No. PCT/US2011/000524.

* cited by examiner

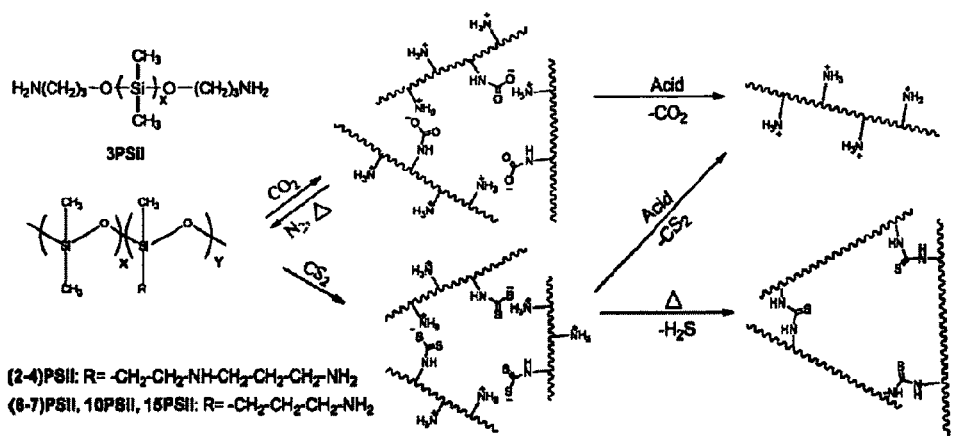
Figure 1: Structures of Polysiloxane Samples and a General Scheme for Their Reactions with $CO_2$ and $CS_2$.
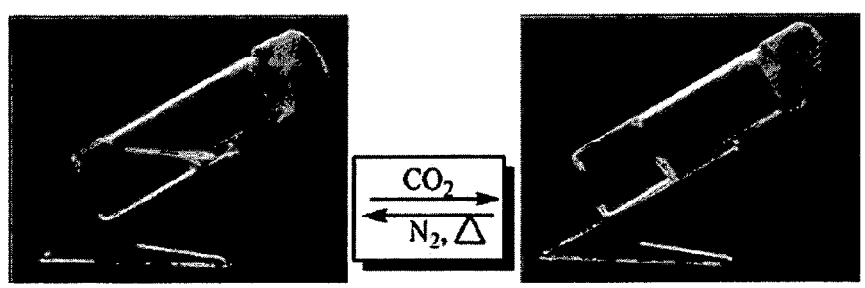
Figure 2. Before (left) and after (right) bubbling $CO_2$ through neat (6-7)PSil at 25°C.

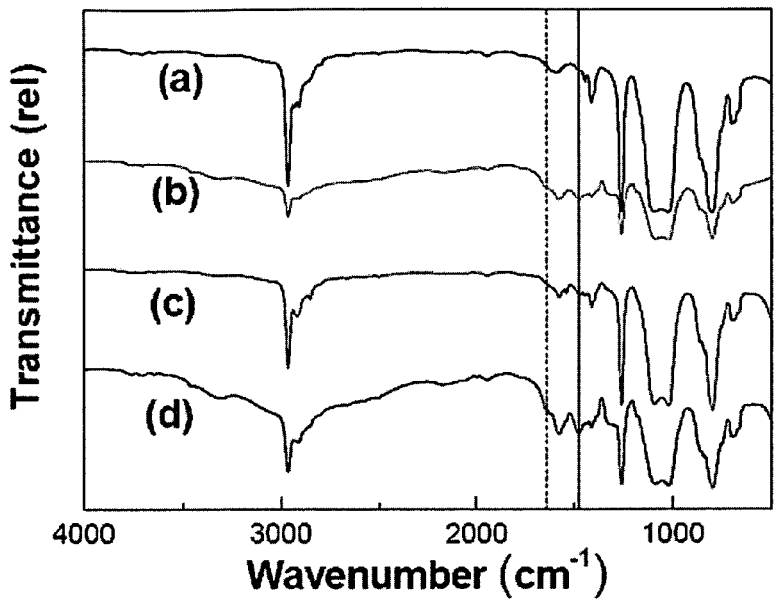

Figure 3. Vertically offset FT-IR spectra recorded sequentially for 15PSil (a), after bubbling $CO_2$ (i.e., 15PSil-$CO_2$) (b), the compound in (b) after bubbling with $N_2$ (c) at 80°C, and the compound in (c) after bubbling with $CO_2$ (d).

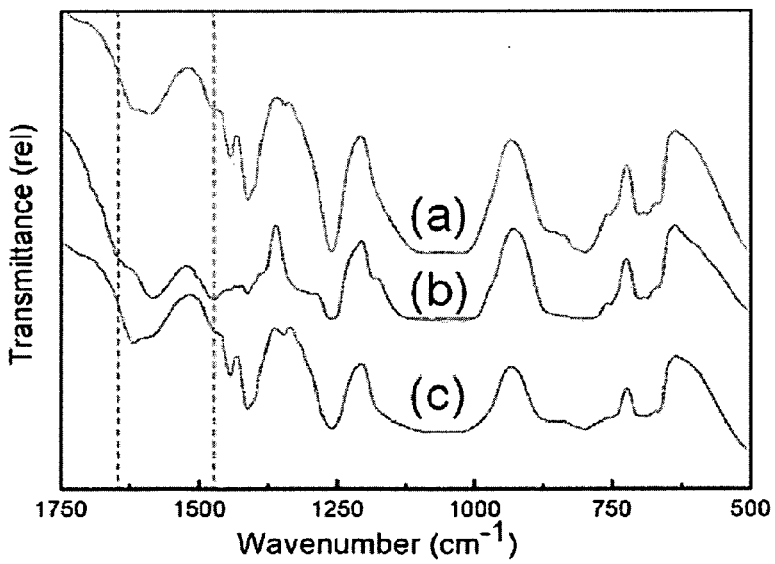

Figure 4. Vertically offset IR spectra recorded sequentially for neat 15PSil (a), after bubbling $CO_2$ (b), and the compound in (a) after bubbling with $N_2$ and heating at 80°C for 60 min (c).

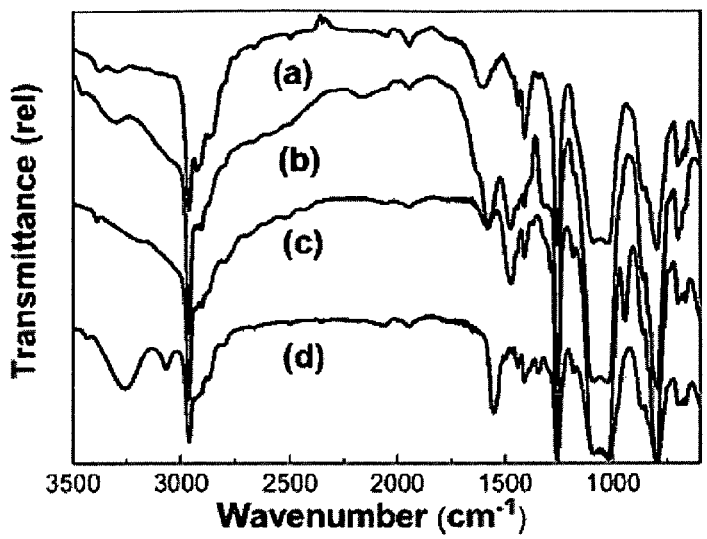
Figure 5. Vertically offset IR spectra of 3PSil (a), 3PSil-$CO_2$ (b), 3PSil-$CS_2$ (c), and 3PSil-$CS_2$-H (d).
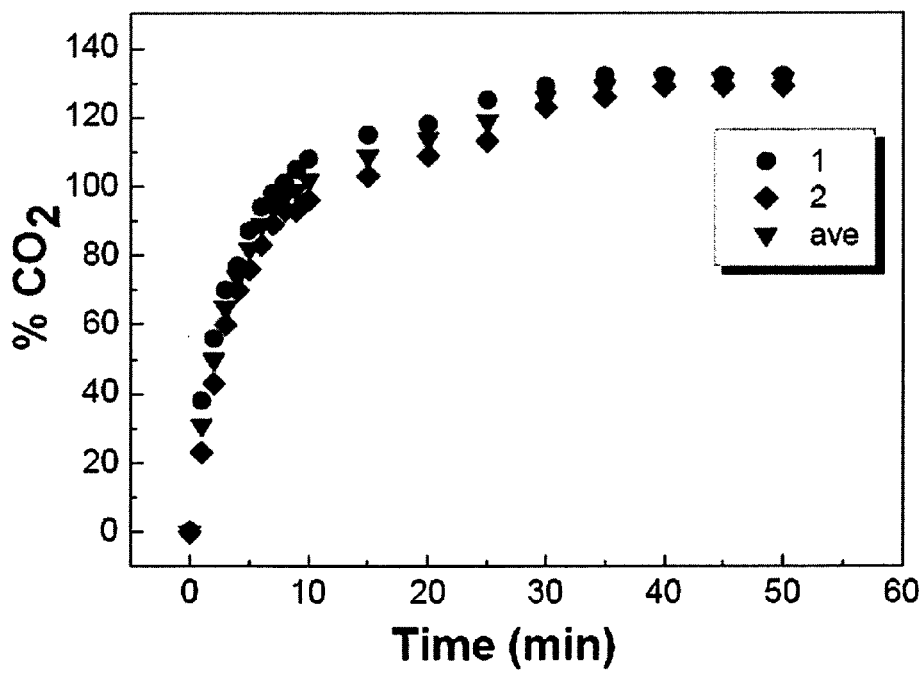
Figure 6. Weight percentage uptake of $CO_2$ (%$CO_2$) by neat (6-7)PSil as a function of time upon exposure to 1 atm pressure of $CO_2$. Two separate runs and their average are shown.

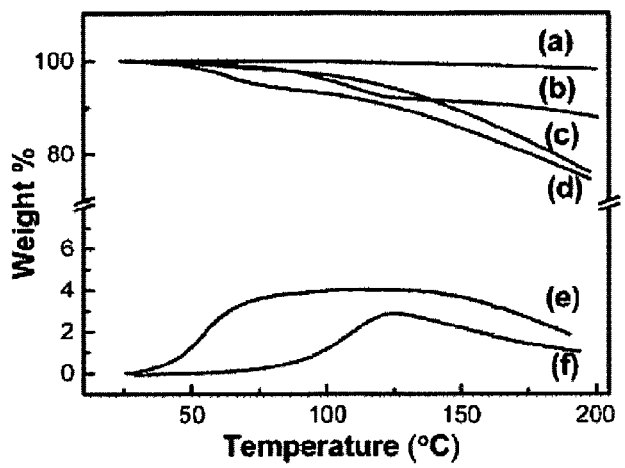
Figure 7. TGA curves of 3PSil-CS$_2$-H (a) heated from room temperature, neat 3PSil(b), 3PSil-CO$_2$ (c), and 3PSil-CS$_2$ (d). Difference curves between 3PSil and 3PSil-CO$_2$ curves (e) and between 3PSil and 3PSil-CS$_2$ curves (f) are shown as well.
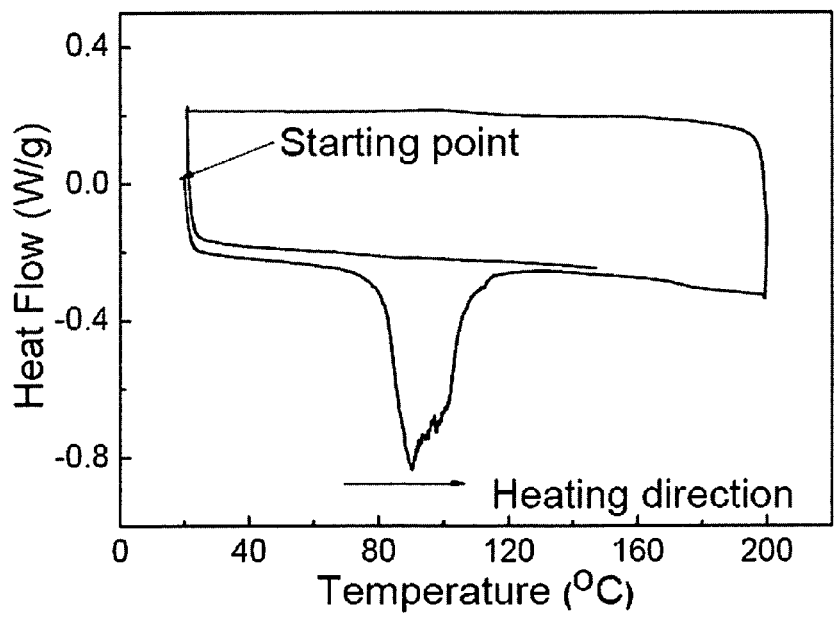
Figure 8. DSC thermograms of 15PSil-CO$_2$. The arrows indicate experiment starting point and direction of temperature change.

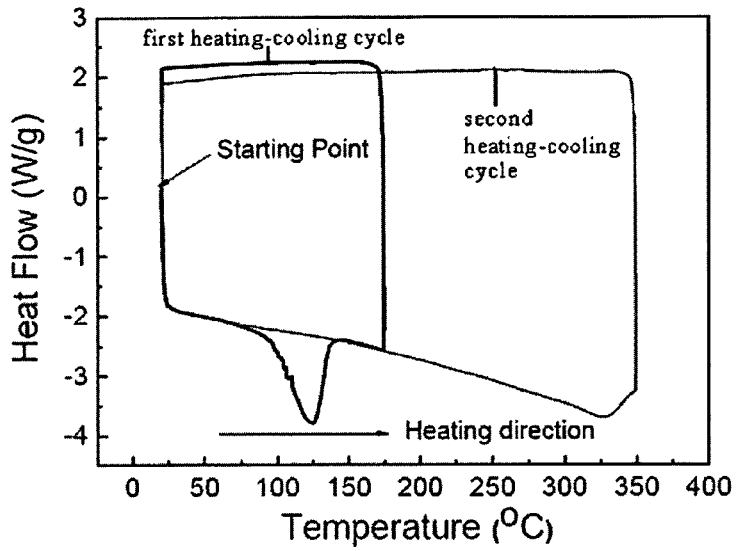

Figure 9. DSC thermograms of 15PSil-CS$_2$. The arrows indicate the experiment starting point and direction of temperature change. The black curve is the first heating-cooling cycle and the red curve is the second cycle.

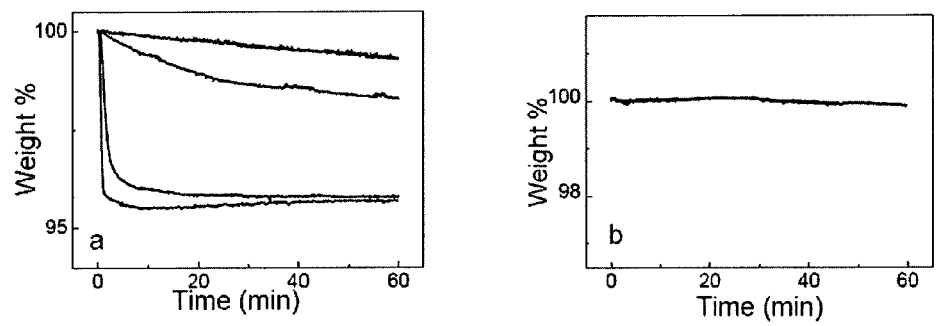

Figure 10. (a) Isothermal TGA weight loss curves of 15PSil-CO$_2$ at various temperatures under a nitrogen flow of 60 cc/min. From top to bottom: 25, 50, 75 and 100°C.
(b) Isothermal TGA weight loss curve of 15PSil-CO$_2$ at 25°C without nitrogen flow.

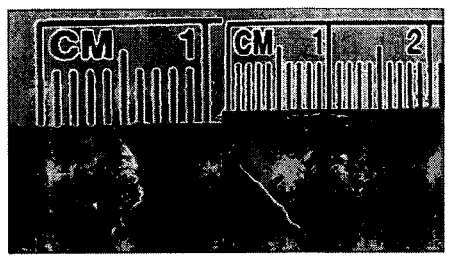
Figure 11. Photographs of (6-7)PSil-CS$_2$ before (left) and after (right) swelling in hexane at room temperature.
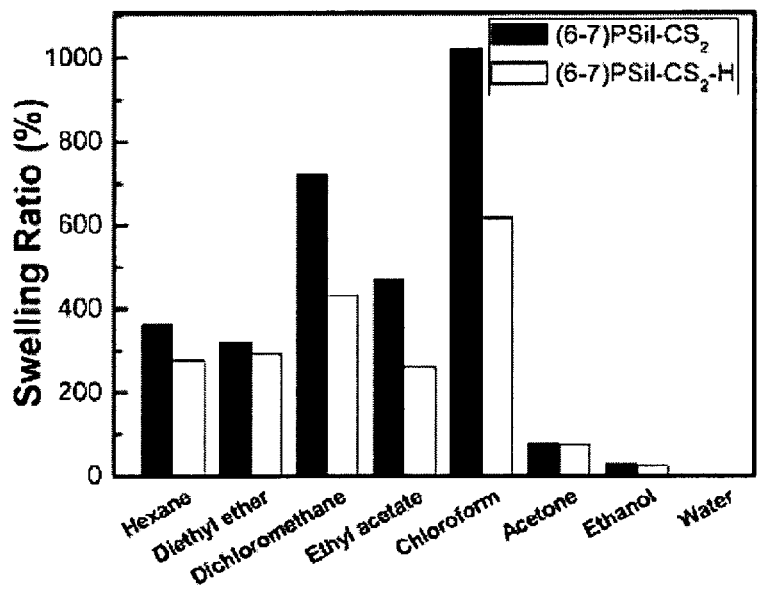
Figure 12. Swelling ratios of (6-7)PSil-CS$_2$ (■) and (6-7)PSil-CS$_2$-H (□) in various liquids at 25°C.

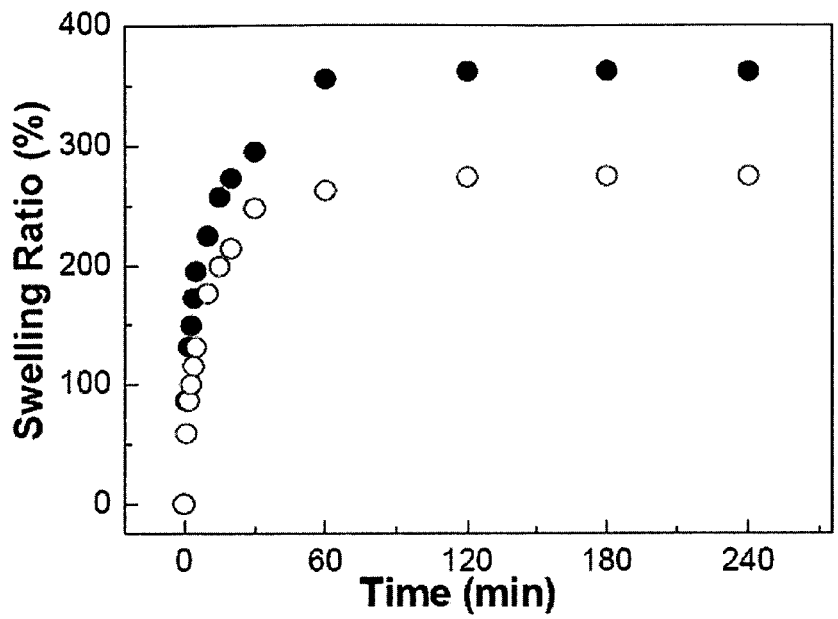
Figure 13. Swelling changes of (6-7)PSil-CS$_2$ (●) and (6-7)PSil-CS$_2$-H (o) in hexane at room temperature.
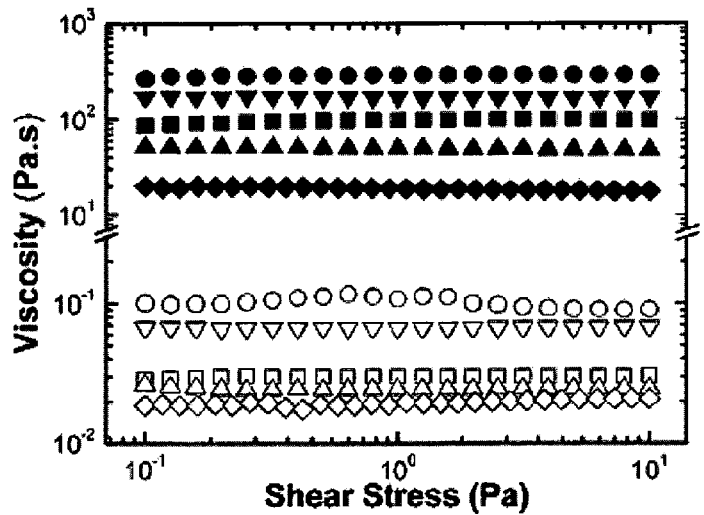
Figure 14. Viscosities (Pa·s) of samples before and after bubbling CO$_2$ as a function of shear stress (Pa) at 25°C: 15PSil-CO$_2$ (●), 10PSil-CO$_2$ (▼), (6-7)PSil-CO$_2$ (■), (2-4)PSil-CO$_2$ (▲), 3PSil-CO$_2$ (♦), 15PSil(O), 10PSil (▽), (2-4)PSil (□), (6-7)PSil (△), and 3PSil(◊).

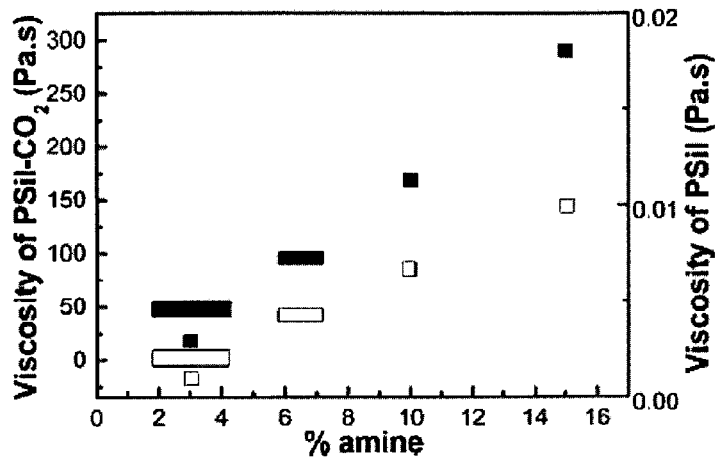
Figure 15. Viscosities of PSil (□, right Y-axis) and PSil-CO$_2$ (■, left Y-axis) versus % amine functionality.
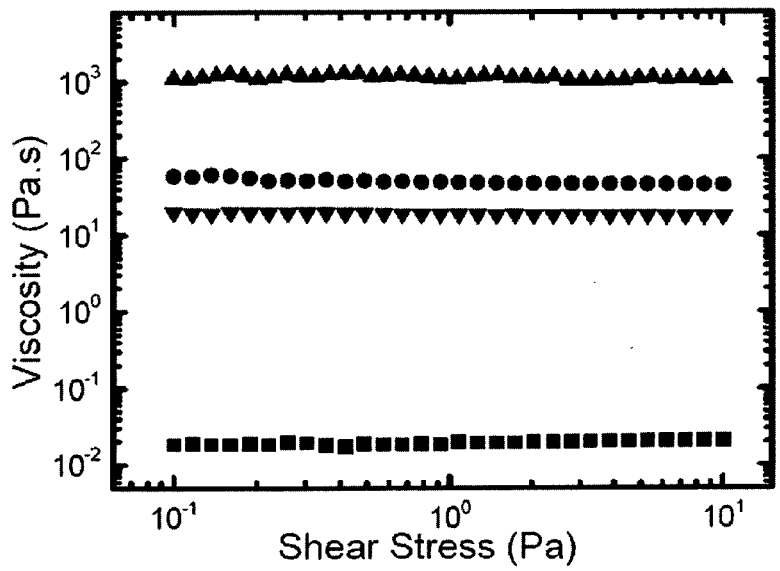
Figure 16. Steady-shear rheology of polysiloxane samples at room temperature (25°C): the apparent viscosities (Pa·S) of 3PSil-CS$_2$-H (▲), 3PSil-CS$_2$ (●), 3PSil-CO$_2$ (▼) and 3PSil (■).

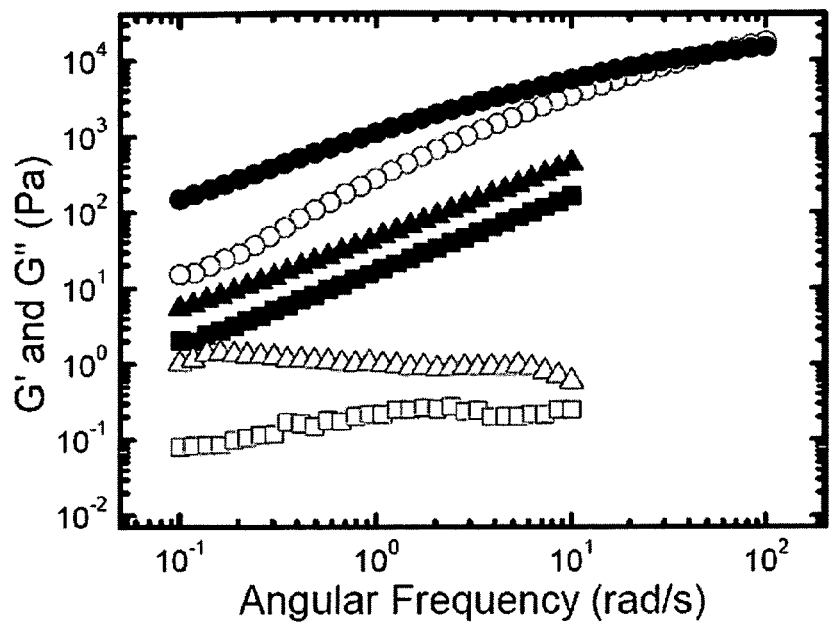
Figure 17. Dynamic rheology of polysiloxane samples at room temperature (25°C): storage modulus (G', solid) and loss modulus (G'', open) of 3PSil-CS$_2$ (▲, △), 3PSil-CO$_2$ (■, □) and 3PSil-CS$_2$-H (●, ○).
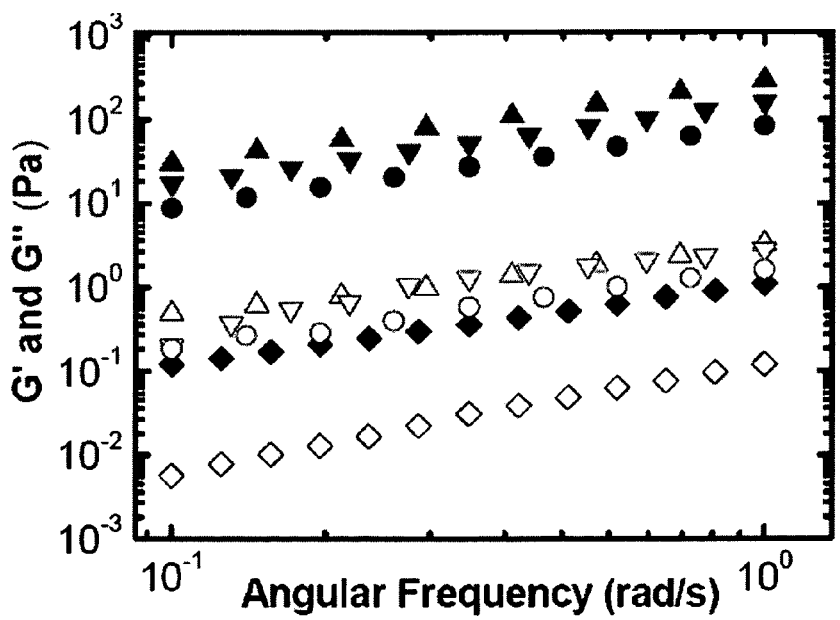
Figure 18. Storage modulus (G', solid symbols) and loss modulus (G'', open symbols) of 15PSil-CO$_2$ (▲, △), 10PSil-CO$_2$ (▼, ▽), (6-7)PSil-CO$_2$ (●, ○), and (2-4)PSil-CO$_2$ (◆, ◇) at 25°C.

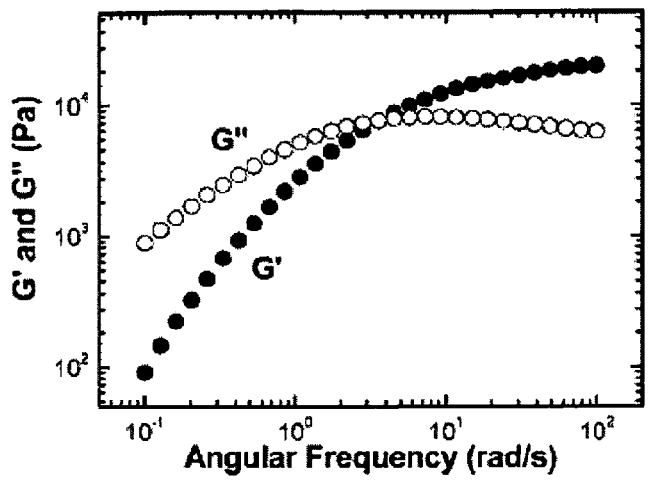
Figure 19. Storage (G', •) and loss moduli (G", O) of (2-4)PSil-CS$_2$ at 25°C.
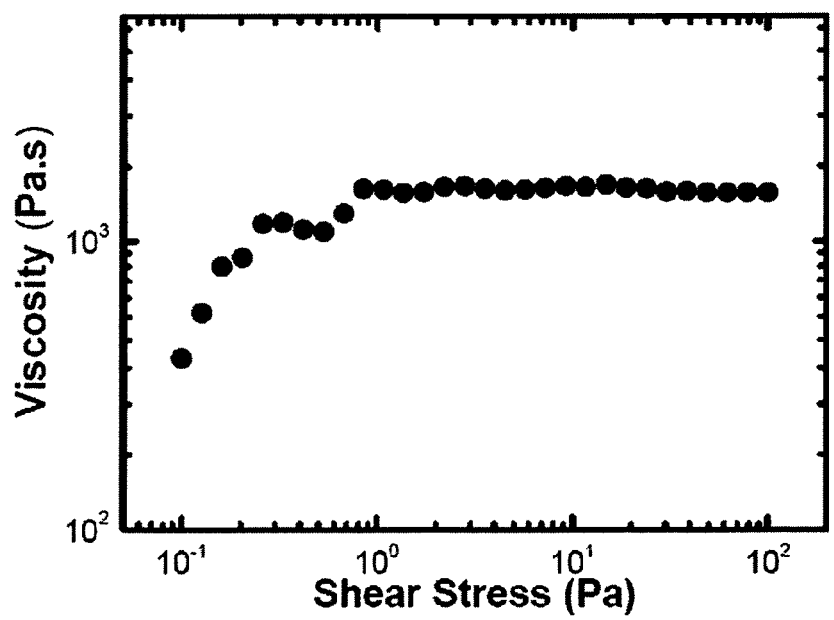
Figure 20. Steady-shear rheology of (2-4)PSil-CS$_2$ at 25°C, as apparent viscosities (Pa•s).

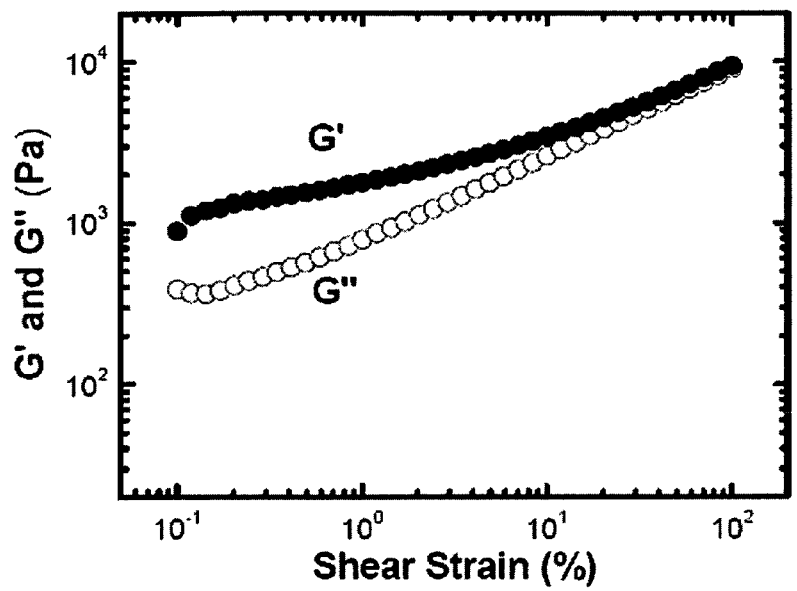
Figure 21. Storage modulus (G', ●) and loss modulus (G", o) of 0.2 equivalents of $CS_2$ in 15PSil sample at 25°C. This corresponds to the formation of the same concentration of ammonium dithiocarbamate units as in 3PSil when treated with one equivalent of $CS_2$.
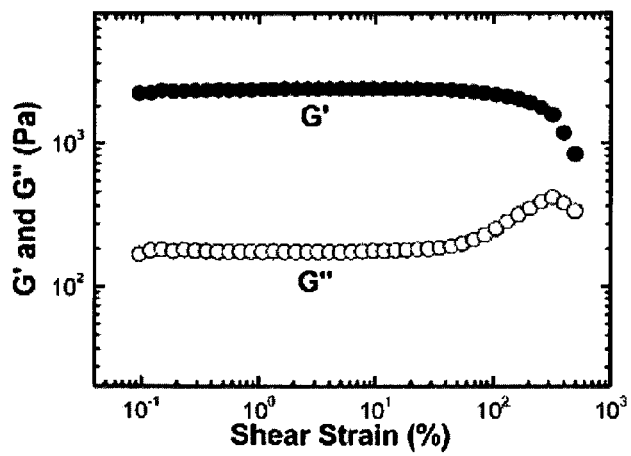
Figure 22. Storage (G', ●) and loss (G", O) moduli of (6-7)PSil-$CS_2$ at 25°C.

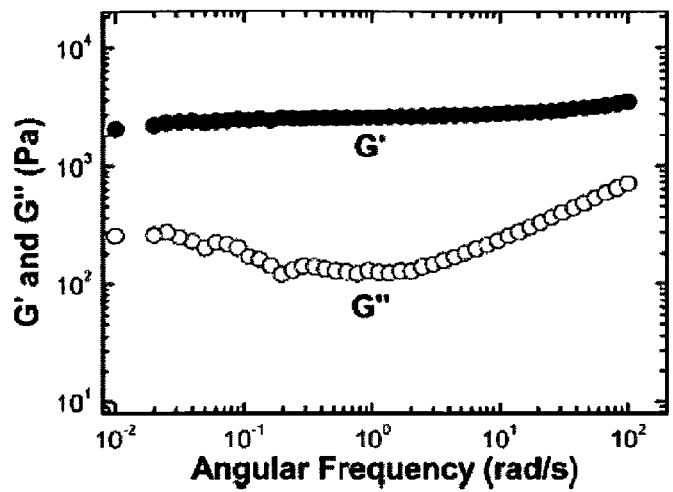
Figure 23. Storage (*G'*, ●) and loss (*G"*, O) moduli of (6-7)PSil-S$_2$ at 25°C.
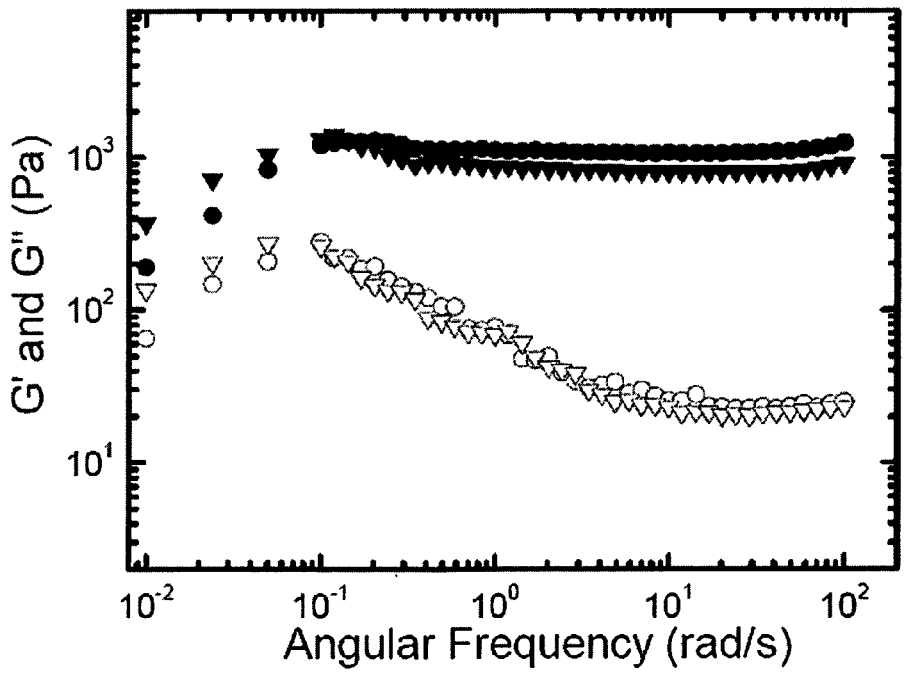
Figure 24. Storage (G', ●, ▼) and loss (G", o, ▽) moduli at 25°C of (6-7)PSil-CS$_2$ swelled in CHCl$_3$ (●,O) and ethyl acetate (▼,▽).

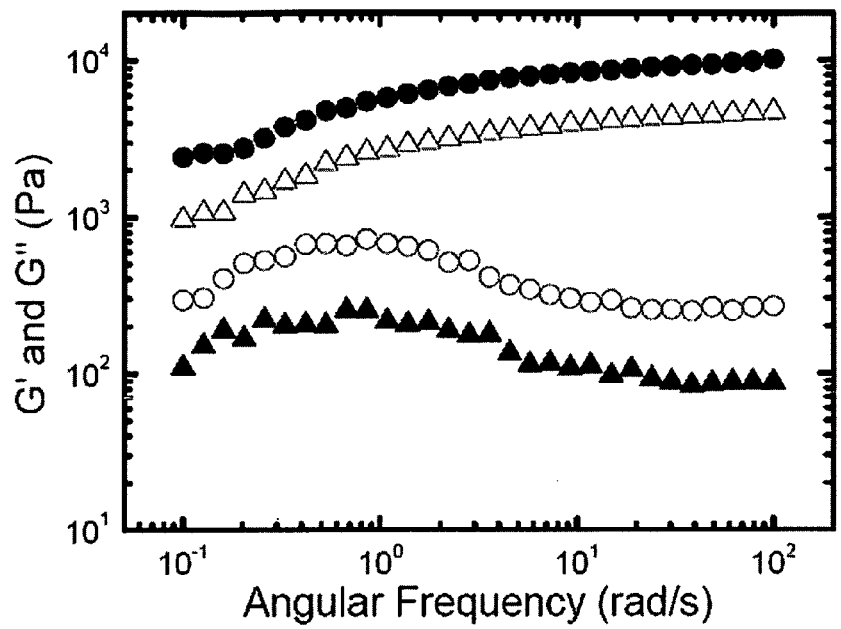

Figure 25. Storage (G', •,▲) and loss (G'', o,Δ) moduli at 25°C of 15PSil-CS$_2$-H (•,O) and 10PSil-CS$_2$-H (▲,Δ) after swelling in hexane.

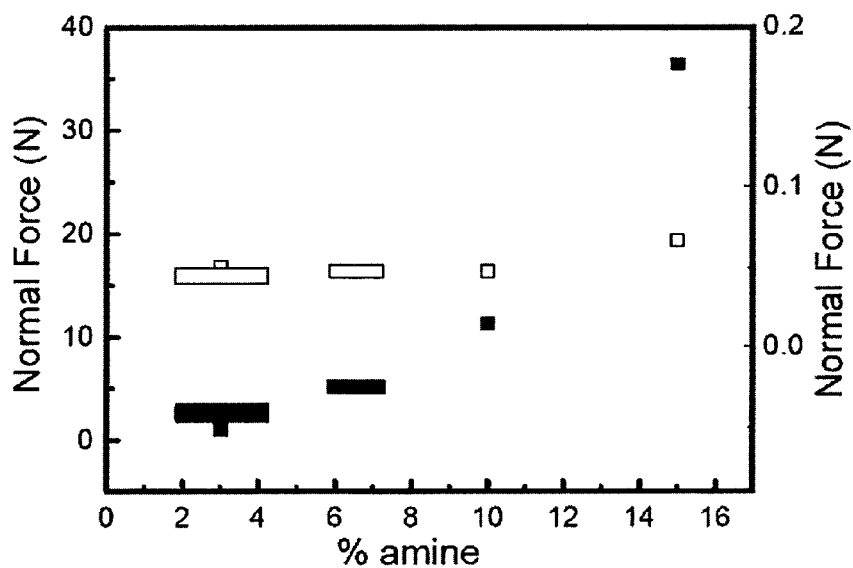

Figure 26. Maximum value of normal force of different % amine functionality polysiloxanes before (□, right Y- axis) and after (■, left Y- axis) CO$_2$ bubbling at 25°C while lifting one plate from the other plate starting at 0.15 mm separation and moving to a final separation of 0.5 mm.

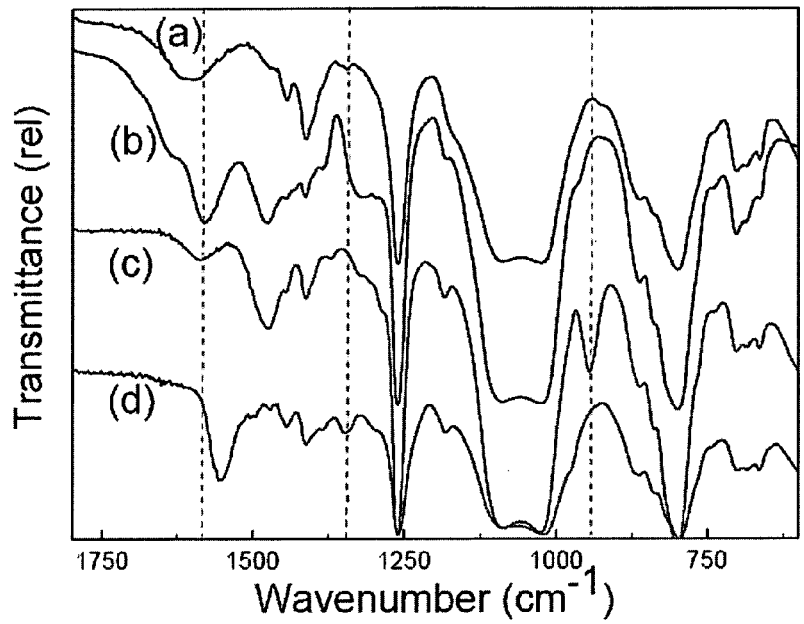

Figure 27. Vertically offset IR spectra (1800cm$^{-1}$ ~ 600cm$^{-1}$) of 3PSil (a), 3PSil-CO$_2$ (b), 3PSil-CS$_2$ (c) and 3PSil-CS$_2$-H (d).

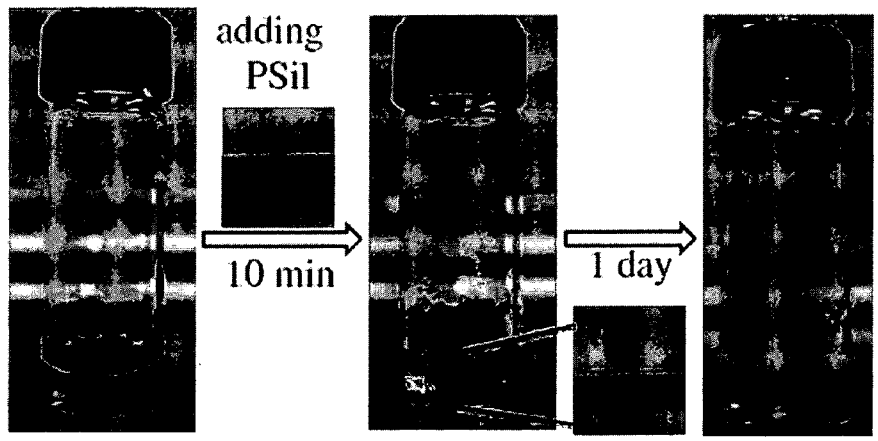

Figure 28. Photographs of water (0.82g) and motor oil (0.15g) mixture before (left) and 10 min after adding a piece of aminopolysiloxane with 10% amino groups that had been treated with CS$_2$ (10PSil-CS$_2$) (60 mg) (center). The red circle indicates the appearance of swelled PSil in the mixture. The swelling ratio is around 190 wt%. The length ratio is around 1.4. After 1 day, oil layer gradually became turbid, indicating an emulsion formed (right).
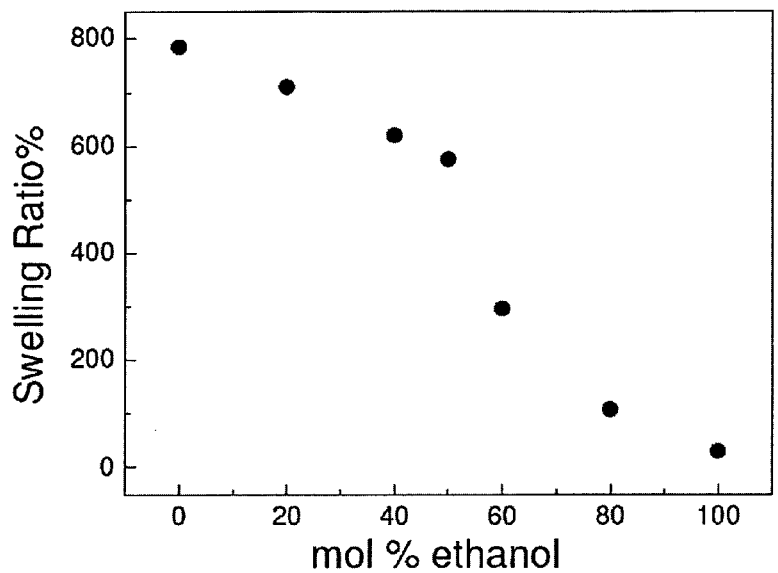
Figure 29. Swelling ratios of 10PSil-CS$_2$ in CH$_2$Cl$_2$ and ethanol solvent mixtures at room temperature.
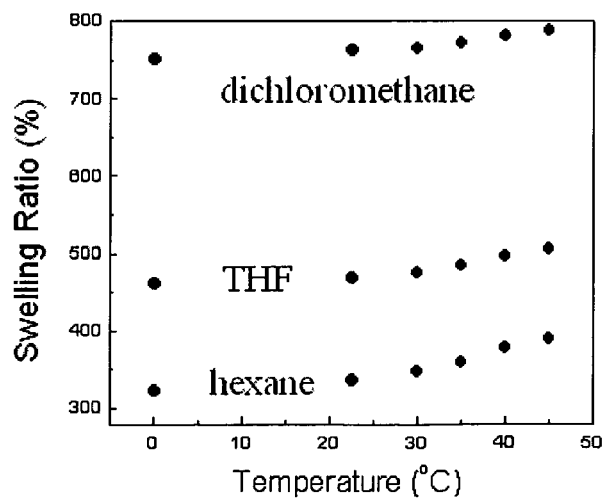
Figure 30. Swelling ratio changes of 10PSil-CS$_2$ in hexane (•), THF (•), and dichloromethane (•) at various temperatures.

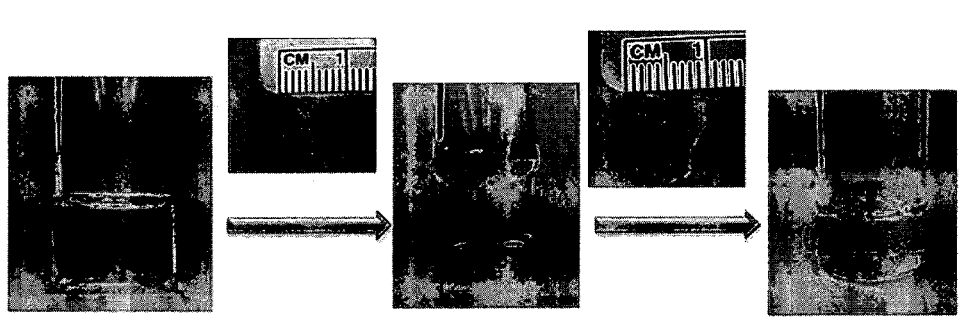

Figure 31. Photographs of a water (1.05 g) and 87-octane gasoline (0.2 g) mixture (left), and after adding 10PSil-CS$_2$ (60 mg) into the mixture for 30 min (middle). The gasoline layer color is indicated by a dye, perylene. The swelling ratio before and after swelling is around 208 wt%. The length ratio is around 1.40 times. Swelled 10PSil-CS$_2$ was removed from the mixture and only a small amount of gasoline can be observed (right).

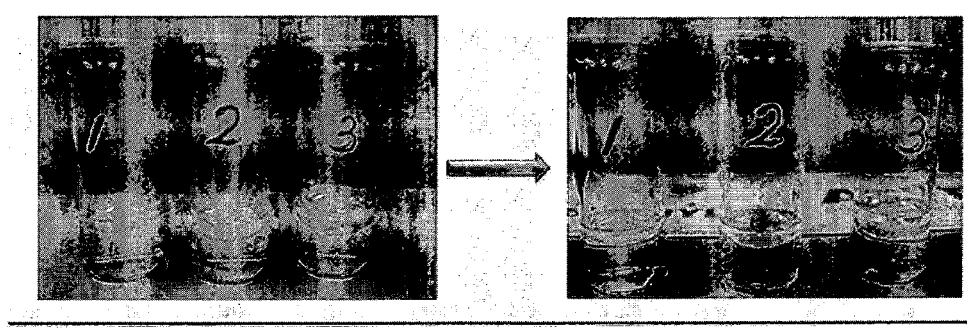

Figure 32. Photographs of water and gasoline or paint remover mixtures (left): (1) water (1.60 g), 87-octane gasoline (0.31g) and 10PSil-CS$_2$ (35 mg); (2) water (1.45 g), Naphtha (0.40 g) and 10PSil-CS$_2$ (48 mg); (3) water (1.55 g), Xylol (0.41g) and 10PSil-CS$_2$ (29 mg). 30 min after adding 10PSil-CS$_2$ into the mixture (right).

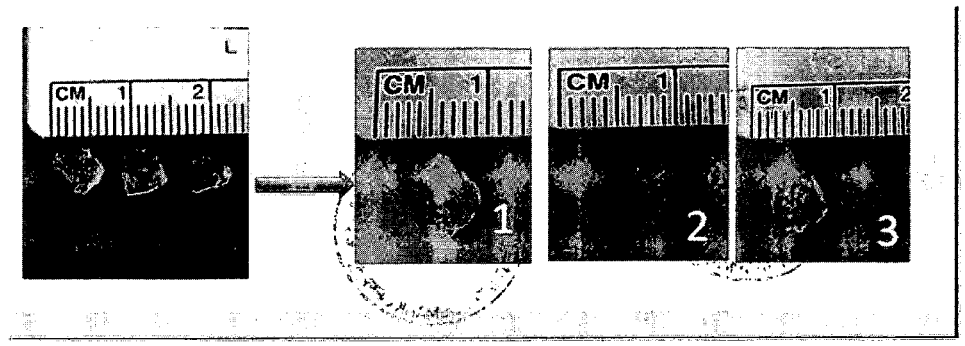

Figure 33. Photographs of 10PSil-CS$_2$ before and after swelling in water and gasoline or paint removers mixture: (I) 87-octane gasoline; (II) Naphtha; (III) Xylol from the experiment described in Figure 2.

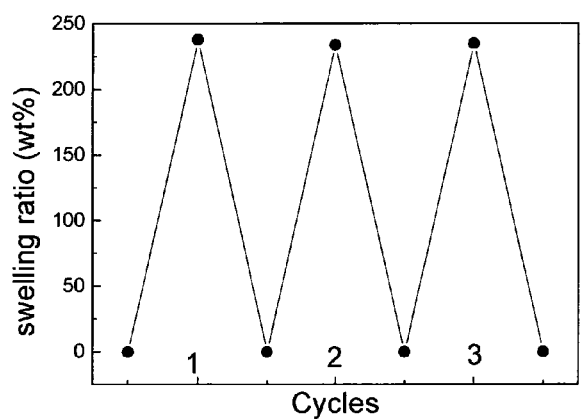

Figure 34. A swelling/deswelling cycle of 10PSil-CS$_2$ (37.8 mg) in a water (1.50 g) and naphtha (II) (0.75 g) mixture was repeated 3 times, and the calculated maximum swelling ratios are 238%, 234% and 235%, respectively.

POLYSILOXANES WITH AMINO FUNCTIONALITIES HAVING REVERSIBLE THICKENING AND ADHESION PROPERTIES AND SYSTEMS AND METHODS FOR CRUDE OIL, PETROLEUM PRODUCT OR CHEMICAL SPILL CONTAINMENT AND REMEDIATION

This application claims benefit of provisional application 61/316,089, filed Mar. 22, 2010 and provisional application 61/376,964 and the entire disclosure thereof are hereby incorporated by reference in their entireties.

TECHNICAL FIELD

Polysiloxane chains covalently linked through at least one thiourea bridge or ionically linked through an ammonium carbamate or dithiocarbamate bridge, reversibly cross-linking amino-polysiloxanes, methods of making such amino-polysiloxanes, and systems and methods of using such amino-polysiloxanes to form gels and/or emulsions that comprise at least one of a crude oil, a petroleum product, and a chemical for the containment and/or remediation of an accidental and/or intentional release of the at least one of the crude oil, the petroleum product and/or the chemical are described. Systems and methods, wherein gels and/or emulsions are made from the combination and/or contacting of such an amino-polysiloxane and at least one of the crude oil, the petroleum product and the chemical from an accidental and/or intentional release can be used to recover these oils or chemicals while allowing the amino-polysiloxane to be recovered and reused to clean up or contain additional crude oil, petroleum products or chemicals are also described. Exemplary systems and methods for containing and/or remediating a spill and/or release of at least one of a crude oil, a petroleum product and a chemical from a spill and/or release into the environment using amino-polysiloxanes are also described. Exemplary methods for selectively separating a lipophilic material from a hydrophilic material using polysiloxane chains covalently linked through at least one thiourea bridge or ionically linked through an ammonium carbamate or dithiocarbamate bridge, are described. In exemplary methods, adhesives and sealants comprising amino-polysiloxanes chains covalently linked through at least one thiourea bridge or ammoniumo-polysiloxanes ionically linked through an ammonium carbamate or dithiocarbamate bridge and methods of using such amino-polysiloxanes are described. In other exemplary methods, the adhesives and sealants can be used in a variety of applications to adhere and/or seal various materials including plastics, metals, glass, ceramics, paper, paper products, wood, wood products and combinations thereof. The adhesives are made by adding either $CO_2$, to make thermally reversible ammonium carbamates, or $CS_2$, to make thermally irreversible ammonium dithiocarbamates that, upon heating, become covalent thiourea crosslinks. Both the carbamates and the dithiocarbamates are reversible when an acid is added; that is, the protonated forms of the amine groups are made and the polysiloxane chains become electrostatically repulsive instead of electrostatically attractive as they are in the carbamate and dithiocarbamate forms.

BACKGROUND

Reversibly cross-linking amino-polysiloxanes and methods of making such amino-polysiloxanes have been described. Systems and methods of using such amino-polysiloxanes to form gels and/or emulsions for containing and/or remediating a spill and/or release of at least one of a crude oil, a petroleum product and a chemical from a spill or release into the environment have not been previously described. Adhesives and sealants comprising such amino-polysiloxanes and methods of using such adhesives and sealants are described. For at least the reasons provided below, reversibly cross-linking amino-polysiloxanes, adhesives and sealants formed using the amino-polysiloxanes are not optimal.

SUMMARY

This application relates to polysiloxane chains having amino functional groups along the chain where the chains are covalently linked through at least one thiourea bridge or ionically linked through an ammonium carbamate or dithiocarbamate bridge, reversibly cross-linking amino-polysiloxanes which can be used to produce gels and/or emulsions which comprise at least one of a crude oil, a petroleum product and a chemical which has been released into the environment. Such polysiloxanes can also be used to produce adhesives and sealants. Crosslinked ammonium carbamates, produced from the addition of $CO_2$ to the polysiloxanes, form ionic bonds which are thermally reversible. However, crosslinked ammonium dithiocarbamates, produced from the addition of $CS_2$ to the polysiloxanes, form from bonds which are not thermally reversible. This application also relates to systems and methods that use gels and/or emulsions made from the combination and/or contacting of the amino-polysiloxanes and oils or chemicals from spills, and/or other accidental or intentional releases, to recover these oils or chemicals while allowing the amino-polysiloxanes to be recovered and reused to clean up or contain additional crude oil, petroleum products or chemicals. Systems for containing and/or remediating a spill and/or release of at least one of a crude oil, petroleum product or chemical from a spill or release into the environment using amino-polysiloxanes are also described. Methods of making adhesives and sealants comprising such amino-polysiloxanes and other methods of using such amino-polysiloxanes are also described. This application also relates to the use of these adhesives and sealants in a variety of applications to adhere and/or seal various materials including plastics, metals, glass, ceramics, paper, paper products, wood, wood products, combinations thereof and the like. Various exemplary materials and methods are described.

In an embodiment, a polysiloxane composition comprises polysiloxane chains having amino functional groups along the chain where the chains are covalently linked through at least one thiourea bridge. In another embodiment, a polysiloxane composition comprises polysiloxane chains having amino functional groups along the chain where the chains are or ionically linked through an ammonium carbamate or dithiocarbamate bridge.

In an embodiment, a method of manufacturing a polysiloxane composition comprising polysiloxane chains having amino functional groups along the chain wherein the chains are covalently linked through at least one thiourea bridge, comprises: (a) forming ionically linked polysiloxane chains by reacting polysiloxane chains having amino functional groups along the chain with carbon disulfide, and (b) heating the ionically linked polysiloxane chains to form polysiloxane chains having amino functional groups along the chain wherein the chains are covalently linked through at least one thiourea bridge.

In an embodiment, a method of manufacturing a polysiloxane composition comprising polysiloxane chains having amino functional groups along the chain wherein the chains are ionically linked through at least one ammonium carbamate or dithiocarbamate bridge, the method comprising forming ionically linked polysiloxane chains by reacting polysiloxane chains having ammonium functional groups along a first chain with different polysiloxane chains having carbamate or dithiocarbamate functional groups along that chain, where each of the chains comprises both ammonium and carbamate or thiocarbamate groups.

In an embodiment, a method of forming a gel and/or emulsion comprising at least one of a crude oil, a petroleum product and a chemical comprises contacting and/or combining the at least one of the crude oil, the petroleum product and the chemical with a polysiloxane composition comprising polysiloxane chains having amino functional groups along the chain wherein the chains are covalently linked through at least one thiourea bridge or ionically linked through an ammonium carbamate or dithiocarbamate bridge, where the at least one polysiloxane has up to about 50%, by monomer content, of amino-functional groups.

In an embodiment, a method of containing a release and/or spill of at least one of a crude oil, a petroleum product and a chemical, comprises forming a gel and/or emulsion comprising the at least one of the crude oil, the petroleum product and the chemical and a polysiloxane composition comprising polysiloxane chains having amino functional groups along the chain wherein the chains are covalently linked through at least one thiourea bridge or ionically linked through an ammonium carbamate or dithiocarbamate bridge, where the at least one polysiloxane has up to about 50%, by monomer content, of amino-functional groups.

In an embodiment, a method of recovering at least one of a crude oil, a petroleum product and a chemical from a spill and/or release into the environment comprises: (a) forming a gel and/or emulsion comprising the at least one of the crude oil, the petroleum product and the chemical and a polysiloxane composition comprising polysiloxane chains having amino functional groups along the chain wherein the chains are covalently linked through at least one thiourea bridge or ionically linked through an ammonium carbamate or dithiocarbamate bridge, where the at least one polysiloxane has up to about 50%, by monomer content, of amino-functional groups; (b) collecting the gel and/or emulsion; and (c) converting the gel and/or emulsion to form at least a first phase comprising predominantly the at least one of the crude oil, the petroleum product and the chemical and a second phase comprising predominantly the polysiloxane.

In an embodiment, a system for containing and/or remediating a spill and/or release of at least one of a crude oil, a petroleum product and a chemical from a spill and/or release into the environment comprises: (a) a polysiloxane composition comprising polysiloxane chains having amino functional groups along the chain wherein the chains are covalently linked through at least one thiourea bridge or ionically linked through an ammonium carbamate or dithiocarbamate bridge; and (b) a means for contacting and/or combining the polysiloxane composition with the at least one of the crude oil, the petroleum product and the chemical.

In an embodiment, a lipophilic material can be separated from a hydrophilic material by (a) contacting and/or combining a mixture comprising a lipophilic material and a hydrophilic material with a polysiloxane composition comprising polysiloxane chains having amino functional groups along the chain wherein the chains are covalently linked through at least one thiourea bridge or ionically linked through an ammonium carbamate or dithiocarbamate bridge, the at least one polysiloxane having up to about 50%, by monomer content of amino-functional groups to form a gel and/or emulsion comprising the lipophilic material and the chemical and the polysiloxane composition; (b) separating the gel and/or emulsion from the hydrophilic material and collecting the gel and/or emulsion; and (c) converting the gel and/or emulsion to form at a least first phase comprising predominantly the lipophilic material and the chemical and a second phase comprising predominantly the polysiloxane.

In an embodiment, a method of manufacturing a reversible adhesive comprises forming an addition product of at least one polysiloxane having amino-functional groups along the chain with at least one of carbon dioxide and carbon disulfide or an ionic linkage between at least two polysiloxanes through an ammonium carbamate or dithiocarbamate bridge, where the at least one polysiloxane has up to about 50%, by monomer content, of amino-functional groups.

In an embodiment, an adhesive or sealant composition comprises (a) an addition product of at least one polysiloxane having amino-functional groups along the chain with at least one of carbon dioxide and carbon disulfide or (b) an ionic linkage between at least two polysiloxanes through an ammonium carbamate or dithiocarbamate bridge, where the at least one polysiloxane has up to about 50%, by monomer content, of amino-functional groups.

In an embodiment, a method of manufacturing a reversible adhesive comprises forming an addition product of at least one polysiloxane having amino-functional groups along the chain with at least one of carbon dioxide and carbon disulfide or an ionic linkage between at least two polysiloxanes through an ammonium carbamate or dithiocarbamate bridge, where the at least one polysiloxane has up to about 50%, by monomer content, of amino-functional groups.

In an embodiment, a method of manufacturing a reversible adhesive comprises forming an ionic bond between at least one polysiloxane having ammonium-functional groups along the chain with at least one polysiloxane having carbamate or dithiocarbamate groups along another chain, where the at least one polysiloxane has up to about 50%, by monomer content, of amino-functional groups.

In an embodiment, a method of reversibly connecting at least a first and a second material comprises: (a) connecting the at least first and second materials by applying a first reversible adhesive composition to at least the first material; (b) bringing the first reversible adhesive composition into contact with at least one of the second material and a second reversible adhesive composition applied to the second material, where the first and second materials are the same or different and the first and second reversible adhesive compositions are the same or different; and (c) disconnecting the first and second materials by: (1) heating the connected first and second materials, when at least one of the first and second reversible adhesive compositions is made using an addition product formed with carbon dioxide; or (2) exposing the connected first and second materials to an acid, wherein the first and second reversible adhesive compositions comprise (a) an addition product of at least one polysiloxane having amino-functional groups along the chain with at least one of carbon dioxide and or carbon disulfide or (b) polysiloxane chains having ammonium functional groups along the chain and polysiloxane chains having dithiocarbamate functional groups along the chain, where the at least one polysiloxane has up to about 50%, by monomer content, of amino-functional groups.

In an embodiment, a method of reversibly connecting at least a first and a second material comprises: (a) connecting the at least first and second materials by applying a first reversible adhesive composition to at least the first material; (b) bringing the first reversible adhesive composition into contact with at least one of the second material and a second reversible adhesive composition applied to the second material, where the first and second materials are the same or different and the first and second reversible adhesive compositions are the same or different; and (c) disconnecting the first and second materials by exposing the connected first and second materials to an acid, wherein the first and second reversible adhesive compositions are ionically crosslinked by the interaction of ammonium groups and carbamate or dithiocarbamate groups in the adhesives, and where the at least one polysiloxane has up to about 50%, by monomer content, of amino-functional groups. The ammonium carbamate crosslinks are reversible thermally. Temperatures of about 60° C. or higher can reverse the bond rapidly, within a few minutes at about 60° C. or in less than one minute at about 100° C. The exact times for reversion depend upon the dimensions of the adhesive, with films (having more surface area) losing their $CO_2$ and adhesion more rapidly than cubic or spherical adhesives.

The applicability of the present teachings to other areas will become apparent from the detailed description provided hereinafter. It should be understood that the detailed description and specific examples, while indicating certain embodiments of the present teachings, are intended for purposes of illustration only and are not intended to limit the scope of the invention.

BRIEF DESCRIPTION OF THE DRAWINGS

FIG. 1 shows exemplary structures of polysiloxane samples and a general scheme for their reactions with $CO_2$ and $CS_2$.

FIG. 2 shows exemplary samples of neat (6-7)PSil before and after bubbling $CO_2$ through the samples at 25° C.

FIG. 3 shows vertically offset FT-IR spectra recorded sequentially for 15PSil (a), after bubbling $CO_2$ (i.e., 15PSil-$CO_2$) (b), the compound in (b) after bubbling with $N_2$ (c) at 80° C., and the compound in (c) after bubbling with $CO_2$ (d).

FIG. 4 shows vertically offset IR spectra recorded sequentially for neat 15PSil (a), after bubbling $CO_2$ (b), and the compound in (a) after bubbling with $N_2$ and heating at 80° C. for 60 min (c).

FIG. 5 shows vertically offset IR spectra of 3PSil (a), 3PSil-$CO_2$ (b), 3PSil-$CS_2$ (c), and 3PSil-$CS_2$—H (d).

FIG. 6 shows the weight percentage uptake of $CO_2$ (% $CO_2$) by neat (6-7)PSil as a function of time upon exposure to 1 atm pressure of $CO_2$.

FIG. 7 shows TGA curves of 3PSil-$CS_2$—H (a) heated from room temperature, neat 3PSil (b), 3PSil-$CO_2$ (c), and 3PSil-$CS_2$ (d). Difference curves between 3PSil and 3PSil-$CO_2$ curves (e) and between 3PSil and 3PSil-$CS_2$ curves (f) are shown as well.

FIG. 8 shows DSC thermograms of 15PSil-$CO_2$.

FIG. 9 shows DSC thermograms of 15PSil-$CS_2$.

FIG. 10 shows (a) Isothermal TGA weight loss curves of 15PSil-$CO_2$ at various temperatures under a nitrogen flow of 60 cc/min. (b) Isothermal TGA weight loss curve of 15PSil-$CO_2$ at 25° C. without nitrogen flow.

FIG. 11 shows photographs of (6-7)PSil-$CS_2$ before and after swelling in hexane at room temperature.

FIG. 12 shows the swelling ratios of (6-7)PSil-$CS_2$ and (6-7)PSil-$CS_2$—H in various liquids at 25° C.

FIG. 13 shows the swelling changes of (6-7)PSil-$CS_2$ and (6-7)PSil-$CS_2$—H in hexane at room temperature.

FIG. 14 shows the viscosities of samples before and after bubbling $CO_2$ as a function of shear stress at 25° C.

FIG. 15 shows the viscosities of PSil and PSil-$CO_2$ versus % amine functionality.

FIG. 16 shows the steady-shear rheology of polysiloxane samples at room temperature (25° C.): the apparent viscosities (Pa·S) of 3PSil-$CS_2$—H, 3PSil-$CS_2$, 3PSil-$CO_2$ and 3PSil.

FIG. 17 shows the dynamic rheology of polysiloxane samples at room temperature (25° C.): storage modulus and loss modulus of 3PSil-$CS_2$, 3PSil-$CO_2$ and 3PSil-$CS_2$—H.

FIG. 18 shows the storage modulus and loss modulus of 15PSil-$CO_2$, 10PSil-$CO_2$, (6-7)PSil-$CO_2$, and (2-4)PSil-$CO_2$ at 25° C.

FIG. 19 shows the storage and loss moduli of (2-4)PSil-$CS_2$ at 25° C.

FIG. 20 shows the steady-shear rheology of (2-4)PSil-$CS_2$ at 25° C., as apparent viscosities (Pa·s).

FIG. 21 shows the storage modulus and loss modulus of 0.2 equivalents of $CS_2$ in 15PSil sample at 25° C.

FIG. 22 shows the storage and loss moduli of (6-7)PSil-$CS_2$ at 25° C.

FIG. 23 shows the storage and loss moduli of (6-7)PSil-$CS_2$ at 25° C.

FIG. 24 shows the storage and loss moduli at 25° C. of (6-7)PSil-$CS_2$ swelled in $CHCl_3$ and ethyl acetate.

FIG. 25 shows the storage and loss moduli at 25° C. of 15PSil-$CS_2$—H and 10PSil-$CS_2$—H after swelling in hexane.

FIG. 26 shows the maximum value of normal force of different % amine functionality polysiloxanes before and after $CO_2$ bubbling at 25° C. while lifting one plate from the other plate starting at 0.15 mm separation and moving to a final separation of 0.5 mm.

FIG. 27 shows IR spectra of 3PSil (a), 3PSil-$CO_2$ (b), 3PSil-$CS_2$ (c) and 3PSil-$CS_2$—H (d) in the range of (1800 $cm^{-1}$~600 $cm^{-1}$).

FIG. 28 shows photographs of a water and motor oil mixture before and after treatment with an aminopolysiloxane with 10% amino groups that had been treated with $CS_2$ (10PSil-$CS_2$).

FIG. 29 shows the swelling ratios of 10PSil-$CS_2$ in $CH_2Cl_2$ and ethanol solvent mixtures at room temperature.

FIG. 30 shows the changes in the swelling ratio of 10PSil-$CS_2$ in hexane, THF, and dichloromethane at various temperatures.

FIG. 31 shows photographs of a water and 87-octane gasoline mixture before and after adding 10PSil-$CS_2$ into the mixture.

FIG. 32 shows photographs of water and gasoline or paint remover mixtures before and after adding 10PSil-$CS_2$ into the mixture.

FIG. 33 shows photographs of 10PSil-$CS_2$ before and after swelling in water and gasoline or paint removers mixture.

FIG. 34 shows the effect of a swelling/deswelling cycle of 10PSil-$CS_2$ in a water and naphtha mixture after three cycles.

DETAILED DESCRIPTION

This application relates to polysiloxane chains having amino functional groups along the chain where the chains are covalently linked through at least one thiourea bridge. The reversibly cross-linking amino-polysiloxanes can be used to produce gels and/or emulsions comprising at least one of a crude oil, a petroleum product and a chemical. Such cross-linked amino-polysiloxanes can be used in methods and systems for containing and/or remediating the release of at least one of a crude oil, a petroleum product and a chemical. The release of the at least one of a crude oil, a petroleum product and a chemical can be due to either accidental releases, such as spills, shipping accidents or broken pipelines, or intentional releases. The reversibly cross-linking amino-polysiloxanes can also be used to produce adhesives and sealants, methods of making such amino-polysiloxanes, adhesives and sealants comprising such amino-polysiloxanes and methods of using such amino-polysiloxanes. This application also relates to the use of these adhesives and sealants in a variety of applications to adhere and/or seal various materials including plastics, metals, glass, ceramics, paper, paper products, wood, wood products, combinations thereof and the like. Various exemplary materials and methods are described.

It is to be understood that this application is not limited to particular embodiments described. It is also to be understood that the terminology used herein is for the purpose of describing particular embodiments only, and is not intended to be limiting, since the scope of the present application will be limited only by the appended claims.

Unless defined otherwise, all technical and scientific terms used herein have the same meaning as commonly understood by one of ordinary skill in the art. Although any methods and materials similar or equivalent to those described herein can also be used in the practice or testing of exemplary embodiments, specific preferred methods and materials are now described.

Definitions:

The following definitions are provided for specific terms which are used in the following written description.

As used herein, the singular form "a", "an" and "the" include plural references unless the context clearly dictates otherwise. For example, the term "a cell" includes a plurality of cells, including mixtures thereof.

As used herein, the term "about" means approximately, in the region of, roughly, or around. When the term "about" is used in conjunction with a numerical range, it modifies that range by extending the boundaries above and below the numerical values set forth. In general, the term "about" or "approximately" is used herein to modify a numerical value above and below the stated value by a variance of 20%.

As used herein, the term "predominantly" means mainly, or for the most part. For example, if a composition comprises predominantly compound A, then compound A is the major material in the composition. In exemplary embodiments, the amount of A is about 50% or greater, preferably about 60% or greater, more preferably about 70% or greater, even more preferably about 80% or greater, even more preferably about 90% or greater, and most preferably about 95% or greater.

As used herein, the term "crude oil" means an unrefined complex mixture of hydrocarbons of various molecular weights, and other organic compounds, that was found in geologic formations beneath the earth's surface.

As used herein, the term "petroleum product" means flammable, toxic, or corrosive products obtained from distilling and processing of crude oil, unfinished oils, natural gas liquids, blend stocks and other miscellaneous hydrocarbon compounds.

As used herein, the term "chemical" means a substance which is capable of forming a gel and/or emulsion when contacted and/or combined with the polysiloxanes described herein.

The terms "crude oil", "petroleum product" and "chemical" refer to substances that are capable of forming a gel and/or emulsion when contacted and/or combined with the polysiloxanes described herein. Such substances include hydrophilic substances and substances which partition into the gel and/or emulsion. Such substances generally have n-octanol/water partition coefficients of greater than 1,000.

As used herein, the term "released into the environment" means that the crude oil, petroleum product or chemical has moved from an intended area to an unintended and/or undesirable area. This term includes accidental and/or intentional movement of the material. Accidental movement includes, but is not limited to, spills, leaks from containers including bottles, drums, pipes, and containment vessels; leaks or discharge of material from transportation vehicles, such as cars, trucks, ships and planes; and leaks from material transport systems, such as pipelines and conveyors. Intentional movement includes, but is not limited to, the releases described above, where the cause of the movement was intentionally performed. Such causes include, but are not limited to, criminal or terrorist activity and combat-related discharges, such as the release of oil from oil wells, ships, refineries and terminals during the Gulf war.

In an embodiment, a polysiloxane composition comprises polysiloxane chains having amino functional groups along the chain wherein the chains are covalently linked through at least one thiourea bridge or are ionically linked through at least one ammonium carbamate or dithiocarbamate bridge. In another embodiment, the polysiloxane chains have the formula:

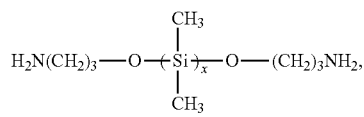

where x is an integer having a value of 1 to about 1,000.

In an embodiment, the at least one polysiloxane of the above formula has about 2% to about 4%, by monomer content, of amino-functional groups. In still another embodiment the polysiloxane chains have the formula:

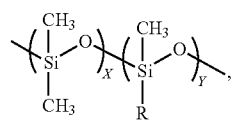

wherein R is a primary alkyl amine or a primary aryl amine, preferably a primary alkyl amine, X is an integer from 0 to about 10,000 and Y is an integer from 2 to about 10,000, wherein X+Y=about 50 to about 10,000 and when X is greater than 0, Y/X is greater than or equal to 0.01. In yet another embodiment, R in the above formula is —CH$_2$—CH$_2$—CH$_2$—NH$_2$ or —CH$_2$—CH$_2$—NH—CH$_2$—CH$_2$—CH$_2$—NH$_2$. In an embodiment, the at least one polysiloxane of the above formula has about 2% to about 4%, by monomer content, of amino-functional groups. In another embodiment, the at least one polysiloxane of the above formula has about 6% to about 7%, by monomer content, of amino-functional groups. In yet another embodiment, the at least one polysiloxane of the above formula has about 10%, by monomer content, of amino-functional groups. In still another embodiment, the at least one polysiloxane of the above formula has about 15%, by monomer content, of amino-functional groups. In still another embodiment, the at least one polysiloxane of the above formula has about 20%, by monomer content, of amino-functional groups. In still another embodiment, the at least one polysiloxane of the above formula has about 25%, by monomer content, of amino-functional groups. In still another embodiment, the at least one polysiloxane of the above formula has about 30%, by monomer content, of amino-functional groups. In still another embodiment, the at least one polysiloxane of the above formula has about 35%, by monomer content, of amino-functional groups. In still another embodiment, the at least one polysiloxane of the above formula has about 40%, by monomer content, of amino-functional groups. In still another embodiment, the at least one polysiloxane of the above formula has about 45%, by monomer content, of amino-functional groups. In still another embodiment, the at least one polysiloxane of the above formula has about 50%, by monomer content, of amino-functional groups.

In another embodiment, a method of manufacturing a polysiloxane composition comprising polysiloxane chains having amino functional groups along the chain wherein the chains are covalently linked through at least one thiourea bridge comprises: (a) forming ionically linked polysiloxane chains by reacting polysiloxane chains having amino functional groups along the chain with carbon disulfide, and (b) heating the ionically linked polysiloxane chains to form polysiloxane chains having amino functional groups along the chain wherein the chains are covalently linked through at least one thiourea bridge. In another embodiment, the polysiloxane chains have the formula:

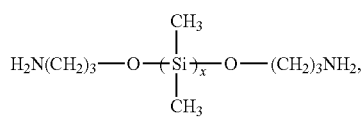

where x is an integer having a value of 1 to about 1,000.

In an embodiment, the at least one polysiloxane of the above formula has about 2% to about 4%, by monomer content, of amino-functional groups. In still another embodiment the polysiloxane chains have the formula:

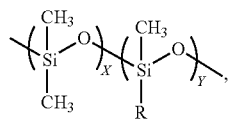

wherein R is a primary alkyl amine or a primary aryl amine, preferably a primary alkyl amine, X is an integer from 0 to about 10,000 and Y is an integer from 2 to about 10,000, wherein X+Y=about 50 to about 10,000 and when X is greater than 0, Y/X is greater than or equal to 0.01. In yet another embodiment, R in the above formula is —CH$_2$—CH$_2$—CH$_2$—NH$_2$ or —CH$_2$—CH$_2$—NH—CH$_2$—CH$_2$—CH$_2$—NH$_2$. In an embodiment, the at least one polysiloxane of the above formula has about 2% to about 4%, by monomer content, of amino-functional groups. In another embodiment, the at least one polysiloxane of the above formula has about 6% to about 7%, by monomer content, of amino-functional groups. In yet another embodiment, the at least one polysiloxane of the above formula has about 10%, by monomer content, of amino-functional groups. In still another embodiment, the at least one polysiloxane of the above formula has about 15%, by monomer content, of amino-functional groups. In still another embodiment, the at least one polysiloxane of the above formula has about 20%, by monomer content, of amino-functional groups. In still another embodiment, the at least one polysiloxane of the above formula has about 25%, by monomer content, of amino-functional groups. In still another embodiment, the at least one polysiloxane of the above formula has about 30%, by monomer content, of amino-functional groups. In still another embodiment, the at least one polysiloxane of the above formula has about 35%, by monomer content, of amino-functional groups. In still another embodiment, the at least one polysiloxane of the above formula has about 40%, by monomer content, of amino-functional groups. In still another embodiment, the at least one polysiloxane of the above formula has about 45%, by monomer content, of amino-functional groups. In still another embodiment, the at least one polysiloxane of the above formula has about 50%, by monomer content, of amino-functional groups.

In another embodiment, a method of manufacturing a polysiloxane composition comprising polysiloxane chains having amino functional groups along the chain wherein the chains are ionically linked through an ammonium carbamate or dithiocarbamate bridge, the method comprising forming ionically linked polysiloxane chains by reacting polysiloxane chains having ammonium functional groups along a first chain with different polysiloxane chains having carbamate or dithiocarbamate functional groups along that chain. Each of the chains comprises both ammonium and carbamate or thiocarbamate groups. In another embodiment, the polysiloxane chains have the formula:

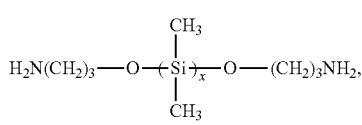

where x is an integer having a value of 1 to about 1,000.

In an embodiment, the at least one polysiloxane of the above formula has about 2% to about 4%, by monomer content, of amino-functional groups. In still another embodiment the polysiloxane chains have the formula:

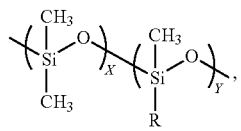

wherein R is a primary alkyl amine or a primary aryl amine, preferably a primary alkyl amine, X is an integer from 0 to about 10,000 and Y is an integer from 2 to about 10,000, wherein X+Y=about 50 to about 10,000 and when X is greater than 0, Y/X is greater than or equal to 0.01. In yet another embodiment, R in the above formula is —CH$_2$—CH$_2$—CH$_2$—NH$_2$ or —CH$_2$—CH$_2$—NH—CH$_2$—CH$_2$—CH$_2$—NH$_2$. In an embodiment, the at least one polysiloxane of the above formula has about 2% to about 4%, by monomer content, of amino-functional groups. In another embodiment, the at least one polysiloxane of the above formula has about 6% to about 7%, by monomer content, of amino-functional groups. In yet another embodiment, the at least one polysiloxane of the above formula has about 10%, by monomer content, of amino-functional groups. In still another embodiment, the at least one polysiloxane of the above formula has about 15%, by monomer content, of amino-functional groups. In still another embodiment, the at least one polysiloxane of the above formula has about 20%, by monomer content, of amino-functional groups. In still another embodiment, the at least one polysiloxane of the above formula has about 25%, by monomer content, of amino-functional groups. In still another embodiment, the at least one polysiloxane of the above formula has about 30%, by monomer content, of amino-functional groups. In still another embodiment, the at least one polysiloxane of the above formula has about 35%, by monomer content, of amino-functional groups. In still another embodiment, the at least one polysiloxane of the above formula has about 40%, by monomer content, of amino-functional groups. In still another embodiment, the at least one polysiloxane of the above formula has about 45%, by monomer content, of amino-functional groups. In still another embodiment, the at least one polysiloxane of the above formula has about 50%, by monomer content, of amino-functional groups.

In another embodiment, a method of manufacturing a reversible adhesive comprises forming an addition product of at least one polysiloxane having amino-functional groups along the chain with at least one of carbon dioxide and carbon disulfide, where the at least one polysiloxane has up to about 50%, by monomer content, of amino-functional groups. In an embodiment, the ammonium dithiocarbamate bridge, which is reversible, is heated to form a thiourea cross-link, which is not reversible. In another embodiment, the polysiloxane chains have the formula:

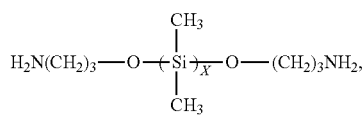

where x is an integer having a value of 1 to about 1,000.

In an embodiment, the at least one polysiloxane of the above formula has about 2% to about 4%, by monomer content, of amino-functional groups. In still another embodiment the polysiloxane chains have the formula:

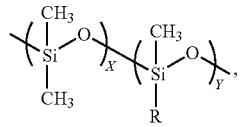

where R is a primary alkyl amine or a primary aryl amine, preferably a primary alkyl amine, X is an integer from 0 to about 10,000 and Y is an integer from 2 to about 10,000, wherein X+Y=about 50 to about 10,000 and when X is greater than 0, Y/X is greater than or equal to 0.01. In yet another embodiment, R in the above formula is —$CH_2$—$CH_2$—$CH_2$—$NH_2$ or —$CH_2$—$CH_2$—NH—$CH_2$—$CH_2$—$CH_2$—$NH_2$. In an embodiment, the at least one polysiloxane of the above formula has about 2% to about 4%, by monomer content, of amino-functional groups. In another embodiment, the at least one polysiloxane of the above formula has about 6% to about 7%, by monomer content, of amino-functional groups. In yet another embodiment, the at least one polysiloxane of the above formula has about 10%, by monomer content, of amino-functional groups. In still another embodiment, the at least one polysiloxane of the above formula has about 15%, by monomer content, of amino-functional groups. In still another embodiment, the at least one polysiloxane of the above formula has about 20%, by monomer content, of amino-functional groups. In still another embodiment, the at least one polysiloxane of the above formula has about 25%, by monomer content, of amino-functional groups. In still another embodiment, the at least one polysiloxane of the above formula has about 30%, by monomer content, of amino-functional groups. In still another embodiment, the at least one polysiloxane of the above formula has about 35%, by monomer content, of amino-functional groups. In still another embodiment, the at least one polysiloxane of the above formula has about 40%, by monomer content, of amino-functional groups. In still another embodiment, the at least one polysiloxane of the above formula has about 45%, by monomer content, of amino-functional groups. In still another embodiment, the at least one polysiloxane of the above formula has about 50%, by monomer content, of amino-functional groups.

In an embodiment, a gel and/or emulsion comprises at least one of a crude oil, a petroleum product and a chemical from an accidental and/or intentional release and a polysiloxane composition comprising polysiloxane chains having amino functional groups along the chain wherein the chains are covalently linked through at least one thiourea bridge or ionically linked through an ammonium carbamate or dithiocarbamate bridge, where the at least one polysiloxane has up to about 15%, by monomer content, of amino-functional groups. In a further embodiment, the polysiloxane composition comprises an addition product of at least one polysiloxane having amino-functional groups along the chain with at least one of carbon dioxide and carbon disulfide, wherein the at least one polysiloxane has up to about 50%, by monomer content, of amino-functional groups. In another embodiment, the addition product is an addition product of the at least one polysiloxane with carbon disulfide. In another embodiment, the polysiloxane chains have the formula:

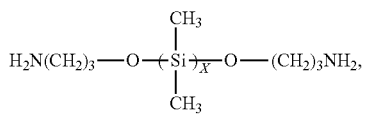

where x is an integer having a value of 1 to about 1,000.

In still another embodiment, the amino content of the at least one polysiloxane is from about 2% to about 4%, by monomer content. In yet another embodiment, the at least one polysiloxane having amino-functional groups is a compound of the formula:

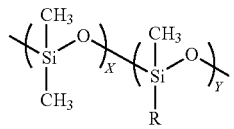

wherein R is a primary alkyl amine or a primary aryl amine, preferably a primary alkyl amine, X is an integer from 0 to about 10,000 and Y is an integer from 2 to about 10,000, wherein X+Y=about 50 to about 10,000 and when X is greater than 0, Y/X is greater than or equal to 0.01. In yet another embodiment, R in the above formula is —$CH_2$—$CH_2$—$CH_2$—$NH_2$ or —$CH_2$—$CH_2$—NH—$CH_2$—$CH_2$—$CH_2$—$NH_2$. In a further embodiment, the amino content of the at least one polysiloxane is from about 2% to about 4% by monomer content. In an embodiment, the at least one polysiloxane of the above formula has about 6% to about 7%, by monomer content, of amino-functional groups. In another embodiment, the at least one polysiloxane of the above formula has about 10%, by monomer content, of amino-functional groups. In yet another embodiment, the at least one polysiloxane of the above formula has about 15%, by monomer content, of amino-functional groups. In still another embodiment, the at least one polysiloxane of the above formula has about 20%, by monomer content, of amino-functional groups. In still another embodiment, the at least one polysiloxane of the above formula has about 25%, by monomer content, of amino-functional groups. In still another embodiment, the at least one polysiloxane of the above formula has about 30%, by monomer content, of amino-functional groups. In still another embodiment, the at least one polysiloxane of the above formula has about 35%, by monomer content, of amino-functional groups. In still another embodiment, the at least one polysiloxane of the above formula has about 40%, by monomer content, of amino-functional groups. In still another embodiment, the at least one polysiloxane of the above formula has about 45%, by monomer content, of amino-functional groups. In still another embodiment, the at least one polysiloxane of the above formula has about 50%, by monomer content, of amino-functional groups.

In an embodiment, a method of containing the release and/or spill of at least one of a crude oil, a petroleum product and a chemical comprises forming a gel and/or emulsion comprising the at least one of the crude oil, the petroleum product and the chemical and a polysiloxane composition comprising polysiloxane chains having amino functional groups along the chain wherein the chains are covalently linked through at least one thiourea bridge or ionically linked through an ammonium carbamate or dithiocarbamate bridge, where the at least one polysiloxane has up to about 50%, by monomer content, of amino-functional groups. In another embodiment, the gel and/or emulsion formed through an ionically linked carbamate is used in a controlled environment under a $CO_2$ atmosphere such as a spill a chemical plant. In a further embodiment, the polysiloxane composition comprises an addition product of at least one polysiloxane having amino-functional groups along the chain with at least one of carbon dioxide and carbon disulfide, wherein the at least one polysiloxane has up to about 50%, by monomer content, of amino-functional groups. In yet another embodiment, the addition product is an addition product of the at least one polysiloxane with carbon disulfide. In another embodiment, the method further comprises collecting the gel and/or emulsion. In still another embodiment, the method further comprises converting the gel and/or emulsion to form at least a first phase comprising predominantly the at least one of the crude oil, the petroleum product and the chemical and a second phase comprising the polysiloxane. In a further embodiment, the phase comprising the polysiloxane is separated from the phase comprising the at least one of the crude oil, the petroleum product and the chemical and a second phase comprising the polysiloxane by placing a mixture comprising the first phase and the second phase in a vessel and removing at least one of the phases from the vessel. In another embodiment, the separation of the phases is enhanced by contacting the mixture with a chemically inert device, such as a screen or filter to release the first phase from the mixture. Polysiloxane which has been separated from the first phase can be recovered and re-used in additional containment and/or remediation activities. In an embodiment, the polysiloxane chains have the formula:

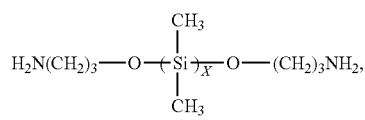

where x is an integer having a value of 1 to about 1,000.

In another embodiment, the polysiloxane chains have the formula:

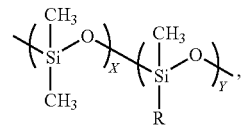

wherein R is a primary alkyl amine or a primary aryl amine, preferably a primary alkyl amine, X is an integer from 0 to about 10,000 and Y is an integer from 2 to about 10,000, wherein X+Y=about 50 to about 10,000 and when X is greater than 0, Y/X is greater than or equal to 0.01. In yet another embodiment, R in the above formula is —$CH_2$—$CH_2$—$CH_2$—$NH_2$ or —$CH_2$—$CH_2$—NH—$CH_2$—$CH_2$—$CH_2$—.

In an embodiment, a method of recovering at least one of a crude oil, a petroleum product and a chemical from a spill and/or release of the at least one of the crude oil, the petroleum product and the chemical into the environment comprises: (a) forming a gel and/or emulsion comprising the at least one of the crude oil, the petroleum product and the chemical and a polysiloxane composition comprising polysiloxane chains having amino functional groups along the chain wherein the chains are covalently linked through at least one thiourea bridge or ionically linked through an ammonium carbamate or dithiocarbamate bridge, where the at least one polysiloxane has up to about 50%, by monomer content, of amino-functional groups; (b) collecting the gel and/or emulsion; and (c) converting the gel and/or emulsion to form at least a first phase comprising predominantly the at least one of the crude oil, the petroleum product and the chemical and a second phase comprising the polysiloxane. In another embodiment, the gel and/or emulsion formed through an ionically linked carbamate is used in a controlled environment under a $CO_2$ atmosphere such as a spill a chemical plant. In a further embodiment, the polysiloxane composition comprises an addition product of at least one polysiloxane having amino-functional groups along the chain with at least one of carbon dioxide and carbon disulfide, wherein the at least one polysiloxane has up to about 50%, by monomer content, of amino-functional groups. In yet another embodiment, the addition product is an addition product of the at least one polysiloxane with carbon disulfide. In another embodiment, the gel and/or emulsion further comprises water. In yet another embodiment, the second phase in step (c) further comprises water. In a further embodiment, the step of collecting the gel and/or emulsion comprises physical removal of the gel and/or emulsion from the environment or removal of the gel and/or emulsion from a contained system. Physical removal of the gel and/or emulsion can be performed using a number of methods known to one of ordinary skill in the art including skimming and/or vacuuming the gel and/or emulsion from the surface and/or a subsurface region of a body or volume of water. In an embodiment, the water is a body of water or a volume of water collected from a volume of treated water comprising the spill and/or release of the at least one of the crude oil, the petroleum product and the chemical. The water may be a body of water, such as an ocean, gulf, bay, harbor, lake, pond, reservoir, river, bayou, stream, creek, canal, marsh, lagoon, or other type of recognized accumulations of water. The water may also be an accumulation of water used in emergency response, such as firefighting, as well as other accumulations of water where the water has come in contact with a crude oil, a petroleum product, and/or a chemical for which it is desirable to remove such material from the water. In an embodiment, the polysiloxane chains have the formula:

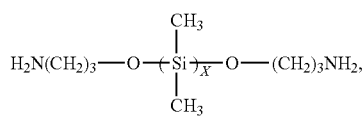

where x is an integer having a value of 1 to about 1,000.

In another embodiment, the polysiloxane chains have the formula:

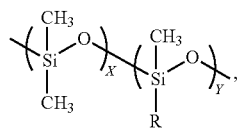

wherein R is a primary alkyl amine or a primary aryl amine, preferably a primary alkyl amine, X is an integer from 0 to about 10,000 and Y is an integer from 2 to about 10,000, wherein X+Y=about 50 to about 10,000 and when X is greater than 0, Y/X is greater than or equal to 0.01. In a further embodiment, R in the above formula is —$CH_2$—$CH_2$—$CH_2$—$NH_2$ or —$CH_2$—$CH_2$—NH—$CH_2$—$CH_2$—$CH_2$—$NH_2$.

In an embodiment, a system for containing and/or remediating a spill and/or release of at least one of a crude oil, a petroleum product and a chemical into the environment comprises: (a) a polysiloxane composition comprising polysiloxane chains having amino functional groups along the chain wherein the chains are covalently linked through at least one thiourea bridge or ionically linked through an ammonium carbamate or dithiocarbamate bridge; the polysiloxane having up to about 50%, by monomer content, of amino-functional groups; and (b) a means for contacting and/or combining the polysiloxane composition with the at least one of the crude oil, the petroleum product and the chemical. In another embodiment, the system further comprises (c) a means for collecting a gel and/or emulsion or composition formed upon contact of the polysiloxane composition with the at least one of the crude oil, the petroleum product and the chemical. In another embodiment, the gel and/or emulsion formed through an ionically linked carbamate is used in a controlled environment under a $CO_2$ atmosphere such as a spill a chemical plant. In yet another embodiment, the system further comprises (d) a means for separating the gel and/or emulsion or composition comprising the polysiloxane composition and the at least one of the crude oil, the petroleum product and the chemical into a first phase comprising predominantly the at least one of the crude oil, the petroleum product and the chemical and a second phase comprising predominantly the polysiloxane. In still another embodiment, the second phase further comprises water. In a further embodiment, the system further comprises a means for collecting at least one of the first phase and the second phase. In an embodiment, the polysiloxane composition comprises polysiloxane chains have the formula:

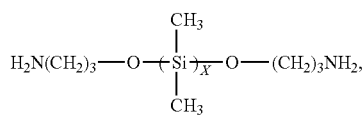

where x is an integer having a value of 1 to about 1,000.

In another embodiment, the polysiloxane composition comprises polysiloxane chains have the formula:

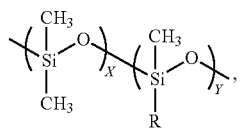

wherein R is a primary alkyl amine or a primary aryl amine, preferably a primary alkyl amine, X is an integer from 0 to about 10,000 and Y is an integer from 2 to about 10,000, wherein X+Y=about 50 to about 10,000 and when X is greater than 0, Y/X is greater than or equal to 0.01. In another embodiment, R in the above formula is —$CH_2$—$CH_2$—$CH_2$—$NH_2$ or —$CH_2$—$CH_2$—NH—$CH_2$—$CH_2$—$CH_2$—$NH_2$. In an embodiment, the means for contacting and/or combining the polysiloxane composition with the at least one of the crude oil, the petroleum product and the chemical comprises applying the polysiloxane composition onto or into the spill and/or release of the at least one of the crude oil, the petroleum product and the chemical to be contained or remediated and/or onto or into water which is, or may become, in contact with the at least one of the crude oil, the petroleum product and the chemical to be contained or remediated. In another embodiment, the polysiloxane composition can be contained within one or more bags or other devices which can be placed on, or into, the at least one of the crude oil, the petroleum product and the chemical to be contained or remediated and/or onto or into water which is, or may become, in contact with the at least one of the crude oil, the petroleum product and the chemical to be contained or remediated. In another embodiment, the one or more bags or other devices can comprise a water-soluble material such that the bags or other devices dissolve and/or form openings upon contact with the water and/or the at least one of the crude oil, the petroleum product and the chemical to be contained or remediated, thus allowing the polysiloxane composition to come in contact with the at least one of the crude oil, the petroleum product and the chemical to be contained or remediated. In still another embodiment, the polysiloxane composition can be contained within containment devices, such as booms or tubes which can be placed on, or into, the at least one of the crude oil, the petroleum product and the chemical to be contained or remediated, or can be placed in water around an area containing the at least one of the crude oil, the petroleum product and chemical to be contained or remediated.

When the polysiloxane comes in contact with the crude oil, the petroleum product or chemical to be contained or remediated, the polysiloxane absorbs the oil, petroleum product or chemical, swells and forms a gel and/or emulsion. The amount of swelling can be quantified by determining the swelling ratio (S). The swelling ratio (S %) is calculated by the equation below, where Wg and Wp are the weights of swelled and dry polymer, respectively:

$$S\%(w/w)=[(W_g-W_p)/W_p]100\%.$$

The swelling ratio is a function of several factors including the specific chemical composition of the crude oil, the petroleum product or chemical to be contained or remediated and the polysiloxane being used. The higher the value of the swelling ratio, the greater the amount of crude oil, petroleum product or chemical to be contained or remediated that is being retained by the polysiloxane. In an embodiment, the swelling ratio is between about 100% and about 400%, preferably between about 150% and about 400%, more preferably between about 200% and about 400%.

The amount of time required for the polysiloxane to swell to about its maximum capacity after it comes in contact with the crude oil, the petroleum product or the chemical to be contained or remediated can be an important property of the polysiloxane. Rapid swelling results from the rapid uptake or absorption of the crude oil, the petroleum product or the chemical to be contained or remediated and allows for quicker containment of such materials than is possible using other containment products. In an embodiment, the amount of time required for the polysiloxane to swell to approximately its maximum capacity is less than about 30 minutes, preferably less than about 20 minutes, more preferably less than about 10 minutes and most preferably less than about 5 minutes, as determined by allowing a mixture of the polysiloxane, water and the crude oil, the petroleum product or the chemical to be contained or remediated, to sit undisturbed in a vessel. In exemplary embodiments, the formation of a gel and/or emulsion can be facilitated by contacting and/or combining the polysiloxane and the at least one of the crude oil, the petroleum product and the chemical and physically mixing and/or agitating the combination. This can be achieved, for example, using various known mixing devices.

The above embodiments describe using the polysiloxanes contain for containing and/or remediating a spill and/or release of at least one of a crude oil, a petroleum product and a chemical into the environment, where the environment may contain water. The polysiloxanes described above can also be used to contain and/or remediate the materials described above when such materials are present on other surfaces, such as concrete, macadam, by placing the above siloxanes into contact with these materials. After a period of time, the materials will combine with the siloxanes for form a gel-like material which can be removed and processed as described above.

The polysiloxanes described above can be used for the selective separation of a lipophilic material from a hydrophilic material. A lipophilic material is a material having a tendency to dissolve in fat-like (e.g., hydrocarbon) solvents. (See IUPAC Gold Book) Examples of lipophilic materials include, but are not limited to hydrocarbons, including both cyclic and non-cyclic hydrocarbons and cyclic and polycyclic aromatic compounds. Examples of such compounds include hexane, heptane, benzene, toluene, diethyl ether, chloroform, methylene chloride, naphthalene, combinations thereof and the like. The lipophilic material can also include mixtures of lipophilic compounds, such as gasoline, naptha, xylol, combinations thereof and the like. The lipophilic compounds can contain any number and type of functional group, provided that the compound prefers to partition into a fat-like solvents rather than into water. The lipophilic compounds can also include heteroatoms within hydrocarbon chains or rings. Some compounds, such as tetrahydrofuran, a cyclic compound with a heteroatom, oxygen, in the ring, can also behave like a lipophilic compound in this system. One of ordinary skill in the art could easily determine through simple, routine experimentation, using the methods described wherein, whether a compound would partition into the polysiloxanes described herein. A hydrophilic material is a material that has a strong affinity for water. Examples of hydrophilic compounds include inorganic salts and alcohols. Hydrophilic compounds can also include polar organic compounds including compounds containing salt forming groups, such as acids or bases.

The polysiloxanes described above can be used for the selective separation of a lipophilic material from a hydrophilic material. In an embodiment, this separation can be performed by (a) contacting and/or combining a mixture comprising a lipophilic and a hydrophilic material with a polysiloxane composition comprising polysiloxane chains having amino functional groups along the chain wherein the chains are covalently linked through at least one thiourea bridge or are ionically linked through an ammonium carbamate or dithiocarbamate bridge, the at least one polysiloxane having up to about 50%, by monomer content, of aminofunctional groups to form a gel and/or emulsion comprising the lipophilic material and the chemical and the polysiloxane composition; (b) separating the gel and/or emulsion from the hydrophilic material and collecting the gel and/or emulsion; and (c) converting the gel and/or emulsion to form at least a first phase comprising predominantly the lipophilic material and the chemical and a second phase comprising the polysiloxane. In an embodiment, the gel and/or emulsion further comprises water. In another embodiment, the second phase in step (c) further comprises water. In a further embodiment step (b) comprises physical removal of the gel and/or emulsion from the environment or removal of the gel and/or emulsion from a contained system. In another embodiment, the polysiloxane composition comprises an addition product of at least one polysiloxane having amino-functional groups along the chain with at least one of carbon dioxide and carbon disulfide. In an embodiment, the polysiloxane chains have the formula:

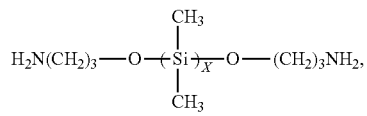

where x is an integer having a value of 1 to about 1,000.

In another embodiment, the polysiloxane chains have the formula:

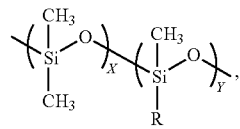

wherein R is an alkyl amine, X is an integer from 1 to about 10,000 and Y is an integer from 2 to about 10,000, wherein X+Y=about 50 to about 10,000 and Y/X is greater than or equal to 0.01. In a further embodiment, R in the above formula is —$CH_2$—$CH_2$—$CH_2$—$NH_2$ or —$CH_2$—$CH_2$—NH—$CH_2$—$CH_2$—$CH_2$—$NH_2$.

In an embodiment, an adhesive or sealant composition comprises an addition product of at least one polysiloxane having amino-functional groups along the chain with at least one of carbon dioxide and carbon disulfide, where the at least one polysiloxane has up to about 50%, by monomer content, of amino-functional groups. In another embodiment, the polysiloxane chains have the formula:

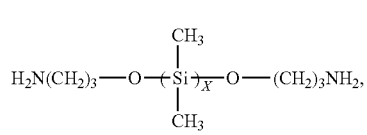

where x is a value of 1-1,000 inclusive.

In still another embodiment the amino content of the at least one polysiloxane is from about 2% to about 4% by monomer content. In yet another embodiment, the at least one polysiloxane having amino-functional groups is a compound of the formula:

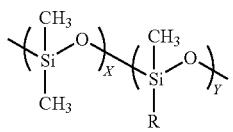

where R is —CH₂—CH₂—NH—CH₂—CH₂—CH₂—NH₂, X is an integer from 1 to about 10,000 and Y is an integer from 2 to about 10,000, wherein X+Y=about 50 to about 10,000 and Y/X is greater than or equal to 0.01. In a further embodiment, the amino content of the at least one polysiloxane is from about 2% to about 4% by monomer content. In an embodiment, the at least one polysiloxane of the above formula has about 6% to about 7%, by monomer content, of amino-functional groups. In another embodiment, the at least one polysiloxane of the above formula has about 10%, by monomer content, of amino-functional groups. In yet another embodiment, the at least one polysiloxane of the above formula has about 50%, by monomer content, of amino-functional groups. In yet another embodiment, the at least one polysiloxane having amino-functional groups is a compound of the formula:

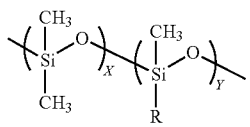

where R is —CH₂—CH₂—CH₂—NH₂, X is an integer from 1 to about 10,000 and Y is an integer from 2 to about 10,000, wherein X+Y=about 50 to about 10,000 and Y/X is greater than or equal to 0.01. In a further embodiment, the amino content of the at least one polysiloxane is from about 2% to about 4% by monomer content. In an embodiment, the at least one polysiloxane of the above formula has about 6% to about 7%, by monomer content, of amino-functional groups. In another embodiment, the at least one polysiloxane of the above formula has about 10%, by monomer content, of amino-functional groups. In yet another embodiment, the at least one polysiloxane of the above formula has about 50%, by monomer content, of amino-functional groups. In another embodiment, the addition product is an addition product of the at least one polysiloxane with carbon disulfide.

In an embodiment, a method of manufacturing a reversible adhesive comprises forming an addition product of at least one polysiloxane having amino-functional groups along the chain with at least one of carbon dioxide and carbon disulfide, where the at least one polysiloxane has up to about 50%, by monomer content, of amino-functional groups. In another embodiment, the at least one polysiloxane having amino-functional groups along the chain is a compound of the formula:

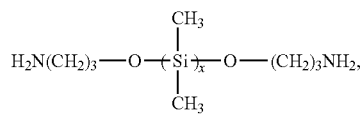

where x is an integer having a value of 1 to about 1,000.

In yet another embodiment, the amino content of the at least one polysiloxane is from about 2% to about 4% by monomer content. In a further embodiment, the at least one polysiloxane having amino-functional groups along the chain is a compound of the formula:

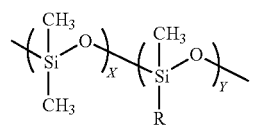

where R is —CH₂—CH₂—NH—CH₂—CH₂—CH₂—NH₂, X is an integer from 1 to about 10,000 and Y is an integer from 2 to about 10,000, wherein X+Y=about 50 to about 10,000 and Y/X is greater than or equal to 0.01. In a still further embodiment, the amino content of the at least one polysiloxane is from about 2% to about 4% by monomer content. In an embodiment, the at least one polysiloxane of the above formula has about 6% to about 7%, by monomer content, of amino-functional groups. In another embodiment, the at least one polysiloxane of the above formula has about 10%, by monomer content, of amino-functional groups. In yet another embodiment, the at least one polysiloxane of the above formula has about 50%, by monomer content, of amino-functional groups. In another embodiment, the at least one polysiloxane having amino-functional groups along the chain is a compound of the formula:

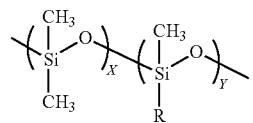

where R is —CH₂—CH₂—CH₂—NH₂, X is an integer from 1 to about 10,000 and Y is an integer from 2 to about 10,000, wherein X+Y=about 50 to about 10,000 and Y/X is greater than or equal to 0.01. In a further embodiment, the amino content of the at least one polysiloxane is from about 2% to about 4% by monomer content. In an embodiment, the at least one polysiloxane of the above formula has about 6% to about 7%, by monomer content, of amino-functional groups. In another embodiment, the at least one polysiloxane of the above formula has about 10%, by monomer content, of amino-functional groups. In yet another embodiment, the at least one polysiloxane of the above formula has about 50%, by monomer content, of amino-functional groups. In yet another embodiment, the step of forming the addition product of at least one polysiloxane with at least one of carbon dioxide and carbon disulfide is performed at about room temperature.

In yet another embodiment, a method of reversibly connecting at least a first and a second material, said method comprises: (a) connecting the at least first and second materials by applying a first reversible adhesive composition to at least the first material; (b) bringing the first reversible adhesive composition into contact with at least one of the second material and a second reversible adhesive composition applied to the second material, wherein the first and second materials are the same or different and the first and second reversible adhesive compositions are the same or different; and (c) disconnecting the first and second materials by: (1) heating the connected first and second materials, when at least one of the first and second reversible adhesive compositions is made using an addition product formed with carbon dioxide; or (2) exposing the connected first and second materials to an acid, wherein the first and second reversible adhesive compositions comprise an addition product of at least one polysiloxane having amino-functional groups along the chain with carbon dioxide or carbon disulfide, where the at least one polysiloxane has up to about 50%, by monomer content, of amino-functional groups. In another embodiment, the at least one polysiloxane having amino-functional groups along the chain is a compound of the formula:

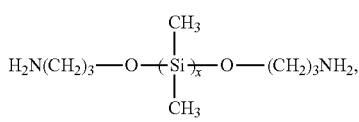

where x is an integer having a value of 1 to about 1,000.

In yet another embodiment, the amino content of the at least one polysiloxane is from about 2% to about 4% by monomer content. In still another embodiment, the at least one polysiloxane having amino-functional groups along the chain is a compound of the formula:

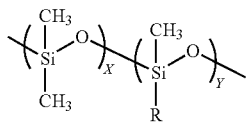

where R is —$CH_2$—$CH_2$—NH—$CH_2$—$CH_2$—$CH_2$—$NH_2$, X is an integer from 1 to about 10,000 and Y is an integer from 2 to about 10,000, wherein X+Y=about 50 to about 10,000 and Y/X is greater than or equal to 0.01. In another embodiment, the amino content of the at least one polysiloxane is from about 2% to about 4% by monomer content. In an embodiment, the at least one polysiloxane of the above formula has about 6% to about 7%, by monomer content, of amino-functional groups. In another embodiment, the at least one polysiloxane of the above formula has about 10%, by monomer content, of amino-functional groups. In yet another embodiment, the at least one polysiloxane of the above formula has about 50%, by monomer content, of amino-functional groups. In a further embodiment, the at least one polysiloxane having amino-functional groups along the chain is a compound of the formula:

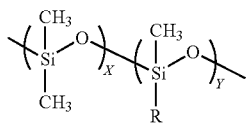

where R is —$CH_2$—$CH_2$—$CH_2$—$NH_2$, X is an integer from 1 to about 10,000 and Y is an integer from 2 to about 10,000, wherein X+Y=about 50 to about 10,000 and Y/X is greater than or equal to 0.01. In an embodiment, the at least one polysiloxane of the above formula has about 6% to about 7%, by monomer content, of amino-functional groups. In another embodiment, the at least one polysiloxane of the above formula has about 10%, by monomer content, of amino-functional groups. In yet another embodiment, the at least one polysiloxane of the above formula has about 50%, by monomer content, of amino-functional groups. In yet another embodiment, the first and second materials are selected from the group consisting of plastics, metals, glass, ceramics, paper products and wood products. In a further embodiment, the first and second materials are selected from the group consisting of Teflon®, paper, cardboard, copper, steel, and glass. In yet another embodiment, the acid is acetic acid or trifluoroacetic acid.

In each of the embodiments described herein, the use of the term polysiloxane also includes a mixture of polysiloxanes. In embodiments related to methods of use of the polysiloxanes, a mixture of polysiloxanes can be used where the composition of the mixture can be adjusted to allow for mixture to be tailored to the specific type of material(s) to be used. For example, a composition comprising polysiloxanes having a mixture of chain lengths can allow for the mixture to form gels and/or emulsions with a wider range of compounds than if a single polysiloxane was used. In another embodiment, a composition comprising polysiloxanes having a mixture of amino functional groups may allow for the mixture to form gels and/or emulsions with a wider range of compounds than if a single polysiloxane was used.

Polysiloxanes are among the most studied and commercially important partially inorganic polymers in use today.[1] Their backbones are very flexible, allowing easy interconversion of conformers. They also have interesting gas permeability and unusual surface properties.[2] As a result, they are used in a myriad of applications, such as drug-delivery systems,[3] high-performance elastomers,[4] membranes,[5] adhesives,[6] coatings,[7] soft lithography stamps,[8] and self-healing materials.[9] The low energy of interaction among polysiloxane chains is responsible for two of their interesting attributes, high malleability and relatively low viscosity. These can also be disadvantageous because polysiloxanes cannot be made into fibers and immobilized films without significant structural modifications (N.B., cross-links between chains). It would be advantageous to be able to interconvert polysiloxanes between low and high interaction energy states so that they can be processed for different purposes without expending a large effort or expense.

Many modifications of the parent polysiloxane structure are known. Usually, a fraction of the methyl groups of the most common polysiloxane, poly(dimethylsiloxane) (PDMS), are substituted by a group containing a different length or functionality (i.e., a one-dimensional structural change).[10] Ladder polysiloxanes possess two-dimensional structural features,[11] while cross-linked polysiloxanes,[12] including tubular and pseu-dosieve plate polysiloxanes, are three-dimensional structures.[13] The nature and extent of the chain cross-links can be varied and each change leads to materials with different chemical and physical properties. The cross-links can be covalent or noncovalent (e.g., hydrogen bonding,[14] metal coordination,[15] etc.). Although the cross-linking can be reversed in some cases, it does not yield the original materials without performing significant physical or chemical manipulations. Clearly, a reversible cross-linking strategy that requires benign changes to the material, mild conditions, and allows the noncross-linked and cross-linked forms to be recovered intact without significant effort would be desirable.

The basis for our approaches is grounded in simple organic chemical transformations that have led to the development of reversible organogels,[16] ionic liquids,[17] and reversible solvents,[18] $CO_2$ fixation-release systems,[19] and supermolecular polymers.[20] It is known that simple, neutral X=Y=X triatomic molecules, in which the X atoms are much more electronegative than the Y atom (e.g., $CO_2$ and $CS_2$), can become "bridge-linkers" for amino groups.[21,22] We reasoned that it should be possible to exploit the general chemistry shown in eqs 1 and 2 to transform weakly interacting chains of uncharged polysiloxanes with substituent amino groups into strongly interacting chains via attractive electrostatic attractions between positive and negative charged centers that lead to cross-links. In a medium of low polarity, such electrostatic forces can be very strong because they vary with the inverse of dielectric constant,[23] and the dielectric constant of silicone polymer is only 3.0-3.5.[24]

Reversal of the $CO_2$-generated ammonium carbamate cross-links can be effected by leaving the material under air or, more rapidly, by bubbling an inert (displacing) gas, such as molecular nitrogen, through the sample (eq 1). Our experience is that the analogous ionic cross-links achieved with $CS_2$, ammonium dithiocarbamates, are not amenable to reversal,[22] but heating produces (permanent) covalent thiourea cross-links instead (eq 2).[25] Clearly, the degree of cross-linking can be controlled by the amount of amine functionality of polysiloxanes (as well as by the amount of the triatomic molecule added to the polymer; vide infra). In this way, the thermal and rheological properties of the polysiloxanes can be tuned easily. Compared with conventional cross-linking methods, this strategy has the advantages of being rapid, isothermal, inexpensive, and (with $CO_2$) reversible.

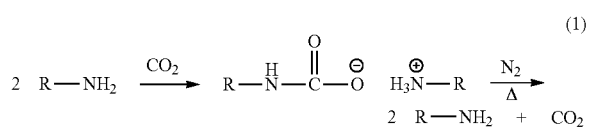

(1)

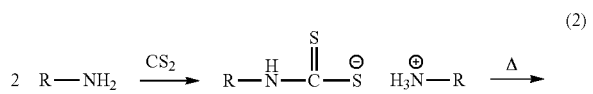

(2)

These cross-linking methods can be used to change at least one of the thermal, rheological, and adhesive properties of polysiloxanes with up to 50% (by monomer content) of aminofunctional groups (PSil). The resulting polymers after addition of a triatomic, PSil-$CO_2$ or PSil-$CS_2$, possess viscosities and adhesiveness that are several orders of magnitude higher than those of the PSil. The PSil-$CO_2$ can be reconverted to their PSil forms by warming and bubbling $N_2$ through them (FIG. 1). This cycle has been repeated without detectable degradation. Warming the PSil-$CO_2$ results in permanent thiourea cross-links and loss of $H_2S$.[25] However, the triatomic adduct can be removed from both the PSil-$CS_2$ and the PSil-$CO_2$ by treatment with an acid such as acetic acid or trifluoroacetic acid, to produce protonated PSil that are flowing liquids. The results demonstrate that the simple chemical changes effected by addition or removal of a triatomic molecule to one of the PSil as a bulk polymer can change its properties in extraordinary fashions of both fundamental an applied interest. Furthermore, the magnitude of those changes can be tuned by the amount of amino functionalities in the PSil.

A facile method for the cross-linking of polysiloxanes with amino functionalities via addition of an uncharged triatomic molecule, $CO_2$ or $CS_2$ has been developed. The cross-linking of these polysiloxanes with $CO_2$ can be reversed easily by mild heating while that with $CS_2$ cannot be. Warming the ammonium dithiocarbamates that are formed upon exposure of the PSil to $CS_2$ results in covalent thiourea cross-links and expulsion of $H_2S$. The changes of the thermal, rheological, and adhesive properties of the polysiloxanes before and after ionic and covalent cross-linking have been examined as a function of the degree of amino substitution on the polymer chains. Several of the properties of the systems can be "tuned" by varying the amino group content along the polymer chains. A remarkable aspect of this work is the extremely large increases in the viscosity and adhesiveness that can be attained simply by bubbling $CO_2$ (or adding $CS_2$) through the polymers. Although there is a direct relationship between the absolute viscosity and the amount of amine functionality in the polymers after addition of a triatomic, no correlation was obvious before, where molecular weight of the polymer chains appears to be the most important factor. The strong adhesion of the PSil-$CO_2$ polymers to various substrates, combined with their reversibility to the original PSils (and loss of adhesive strength) opens prospects for creating reversible, stimuli-responsive adhesives[45] or sealants in which adhesion can be controlled by environmental conditions.[46]

The PSil-$CS_2$ and the PSil-$CS_2$—H materials that they yield upon heat treatments are also polymer gels, and their gel-like properties are apparent from their ability to be swelled to several-fold their original volumes by some organic solvents. Again, this ability to be swelled and deswelled can lead to interesting new applications for polysiloxanes. Although heating the PSil-$CS_2$ cannot reconvert them to their PSil forms, as can the PSil-$CO_2$, exposing them to a strong acid produces ammonium groups along the chains (i.e., protonated PSil) that flow again like liquids, have lost their gel-like properties, and are no longer strong adhesives.

This work demonstrates that organic chemistry can be applied to a set of complex polymers to change enormously their macroscopic properties. The nature of those changes have been documented step-by-step through a combination of spectroscopic and rheological measurements. This strategy provides not only an effective alternate to the more classical method to cross-link polymers, but also a route to two classes of novel materials with interesting physical and chemical properties.

Potential new applications include the use of polysiloxanes as cleaning agents in art conservation, where rheoreversibility and swelling by organic liquids are highly desirable attributes.[47] In addition, our swollen polysiloxanes can be useful packing materials for chromatography[48] and as aligning media for NMR measurements.[49] This approach can also be useful in the synthesis of new polymers from monomers pretreated with $CO_2$ or $CS_2$.[50] Experiments to exploit some of these uses and to expand the range of polymers that are cross-linked by these methods are underway.

The present disclosure will be further understood with reference to the following non-limiting examples.

EXAMPLES

Instrumentation:

IR spectra were obtained on a Perkin-Elmer Spectrum One FT-IR spectrometer interfaced to a PC, using an attenuated total reflection accessory or NaCl plates. Thermal gravimetric analysis (TGA) measurements were conducted under a dynamic nitrogen atmosphere (60 cm$^3$/min unless stated otherwise) at a 5 deg/min heating rate on a TGA Q50 thermo gravimetric analyzer (TA Instruments, New Castle, Del.) interfaced to a computer. Differential scanning calorimetry (DSC) measurements were recorded on a DSC Q200 calorimeter (TA Instruments, New Castle, Del.) interfaced to a TA Thermal Analyst 3100 controller, and equipped with a refrigerated cooling system (RCS90) to control the cooling rates. Samples were sealed in aluminum cells and heated at 10 deg/min under a N$_2$ atmosphere. Rheological experiments were performed on an Anton Paar Physica MCR 301 rheometer (Anton Paar GmbH, Graz, Austria), using a parallel plate (radius 25 mm, gap 0.5 mm) or cone-and-plate (radius 25 mm, gap 0.5 mm, cone angle 1°, truncation 49, um) geometry. Samples were equilibrated at 25° C. for about 5 min before starting measurements (at 25° C.) in order to eliminate any mechanical hysteresis. Dynamic frequency-sweep spectra were conducted in the linear viscoelastic regime of each sample as determined by dynamic stress-sweep tests. All measurements were carried out within one week of sample preparation. The percentage of CO$_2$ uptake (percent CO$_2$, based upon the stoichiometric amount calculated from the amino content of a PSil) was measured with a mercury burette apparatus that is based on a design described in ref 26.

Materials:

3-[(2-Aminoethyl)amino]propylmethoxysiloxane-dimethylsiloxane copolymer with 2-4% amino content ((2-4)PSil), 3-aminopropylmethylsiloxane-dimethylsiloxane copolymer with 6-7% amino content ((6-7)PSil), and 3-aminopropyl-terminated polydimethylsiloxane with (3.2-3.8) % amino content (3PSil) were from Gelest, Inc., which also supplied the characterization data. For (2-4)PSil: bp>205° C., mp<−60° C., and dynamic viscosity=200-300 mPa·s; Mw not reported. For (6-7)PSil: by >205° C., mp<−60° C., weight-average molecular weight Mw≈4000-5000, and dynamic viscosity) 80-120 mPa·s. For 3PSil: Mw≈850-900 and viscosity=10-15 mPa·s. 3-Aminopropylmethylsiloxane-dimethylsiloxane copolymers with 10% and 15% amino groups (10PSil and 15PSil, respectively) were gifts from Dr. Dmitri Katsulis and Mr. Kenneth E. Zimmerman of Dow-Corning Corp., who also supplied their characterization data. For 10PSil: Mw≈9950, polydispersity (PD)=1.71, and dynamic viscosity=100 mPa·s. For 15PSil: Mw≈9650, PD=1.71, and dynamic viscosity=100 mPa·s. All reagents were used as received unless stated otherwise. Organic solvents for the swelling of gels were reagent grade or better (Aldrich). Carbon disulfide (anhydrous, 99.9%) was purchased from Aldrich. Carbon dioxide gas was generated by warming dry ice and was dried by passing it through a tube filled with Drierite (CaSO$_4$).

Sample Preparations:

Synthesis of Ammonium Carbamate Polysiloxanes (PSil-CO$_2$):

Dry CO$_2$ gas was bubbled gently through a stirred polysiloxane sample in a glass vial for 1 h. The vial was placed in a water bath during the CO$_2$ addition to dissipate the heat from the exothermic reaction.

Synthesis of Ammonium Dithiocarbamate Polysiloxanes (PSil-CS2):

Two molar equivalents of carbon disulfide were slowly added to a PSil in a closed glass vial. The vial was sonicated in an ultrasonic cleaner for 1 h and allowed to stand for 2 days, then the contents were placed under a house vacuum for 24 h to remove excess CS$_2$.

Synthesis of Thiourea Cross-Linked Polysiloxanes (PSil-CS$_2$—H):

The procedure above was followed but the sample was heated to 120° C. for 1 h and cooled to room temperature 3 times instead of being placed under a house vacuum. The resulting material was kept in a vacuum oven at 40° C. for 24 h to remove any dissolved H$_2$S and residual CS$_2$. The thiourea-containing samples are slightly yellow.

Acidification Experiments:

Either acetic acid or trifluoroacetic acid (1 mL) was added to 1 g of PSil-CO$_2$ or PSil-CS$_2$ in a closed glass vial and the mixture was stirred for 1 h.

Procedure for Swelling:

A weighed aliquot (ca. 50 mg) of polymer and 3 mL of a liquid were placed in a closed screw-cap glass vial for 24 h. The polymer was removed, its surface was dried quickly on a piece of filter paper, and it was reweighed. The swelling ratio (S %) was calculated by the equation below, where Wg and Wp are the weights of swelled and dry polymer, respectively.

$$S\%(w/w))[(W_g-W_g)/W_p]100\%$$

The temporal uptake of liquid was determined by removing the polymer at different times from the liquid, weighing it, and placing it anew into the liquid until no weight increase could be detected.

Adhesion Test Procedures:

An aliquot of polymer was placed on the steel base plate of the rheometer, and the upper parallel steel plate was moved into contact with the upper surface of the polymer. The initial gap was set at 0.15 mm. The system was left undisturbed for 10 min to form an equilibrated interfacial contact. Then, the top plate was lifted vertically to a plate gap of 0.50 mm. The normal force response in this process was recorded by the rheometer. All measurements were performed at 25° C. No data were collected with PSil-CS$_2$ because the force required exceeded the capabilities of the rheometer.

Characterization of Polysiloxanes:

Bubbling CO$_2$ through the stirred polysiloxanes for a few minutes resulted in a noticeable and significant increase in viscosity (FIG. 2). In a separate experiment reported in FIG. 3, a flowing 15PSil sample like that shown in FIG. 2 was regenerated by bubbling N$_2$ gas through its nonflowing 15PSil-CO$_2$ analogue at 80° C. to increase the rate of displacement of CO$_2$. The cross-linking from formation of ionic pairs, as ammonium and carbamate centers are created (FIG. 1), can be monitored conveniently by FT-IR spectroscopy (FIG. 4 with 15PSil as an example). After CO$_2$ bubbling, a CdO stretching band at 1640 cm$^{-1}$, typical of a carbamate,[27] was observed as a shoulder. In addition, a medium strong band, centered at 1586 cm$^{-1}$, can be assigned to the N—H bending;[28] the corresponding peak was located at 1598 cm$^{-1}$ in (6-7)PSil before CO$_2$ bubbling and after passing N$_2$ through (6-7)PSil-CO$_2$. Also, a band ascribed to the asymmetric vibration of C—Si—C shifted to 1472 cm$^{-1}$ upon bubbling CO$_2$ through the (6-7)PSil. The change in the IR frequency demonstrates that a chemical change occurred, and it is reasonable to ascribe it to the uptake of CO$_2$.

TABLE 1

Assignment of infrared absorption bands (cm$^{-1}$) of 3PSil and its derivatives.

| | 3PSil | 3PSil-CO$_2$ | 3PSil-CS$_2$ | 3PSil-CS$_2$—H |
|---|---|---|---|---|
| N—H stretching | 3374, 3285 | 3452, 3305 | 3387, 3190 | 3257, 3068 |
| C—H stretching | 2962, 2924 | 2962, 2899 | 2962, 2903 | 2961, 2900 |
| C=O stretching | | 1635 | | |
| N—H bending | 1614 | 1578 | 1585 | 1552 |
| —CH$_2$—CH$_3$ bending | 1443, 1411 | 1411 | 1411 | 1444, 1411 |
| C—N stretching | | 1472 | 1474 | |
| Si—C | 1260 | 1260 | 1260 | 1259 |
| Si—O—Si | 1090, 1024 | 1090, 1022 | 1090, 1026 | 1089, 1021 |
| C=S | | | 1370 | 1348 |
| C—S | | | 945 | |

Similarly, exposure of the amino-terminated polysiloxane 3PSil to CO$_2$ led to a rapid increase in its viscosity. The infrared spectrum in FIG. 5 for the product of the reaction is consistent with the 3PSil-CO$_2$ structure; its new absorption bands are almost the same as those found in the spectrum of 15PSil-CO$_2$. The formation of ammonium dithiocarbamates in polysiloxanes upon addition of CS$_2$ is also indicated by FT-IR spectra. An N—H bending band was found at 1552 cm$^{-1}$, and the bands at 1370 and 945 cm$^{-1}$ can be assigned to C=S and C—S stretchings, respectively.[29] Upon heating a 3PSil-CS$_2$ sample to 120° C. (to form 3PSil-CS$_2$—H), the N—H stretching band shifts from 3190 cm$^{-1}$ to 3068 cm$^{-1}$ as a result of H-bonding interactions. The C—S stretching band at 945 cm$^{-1}$ is no longer present and the C=S stretching band shifts to 1348 cm$^{-1}$.[30] The IR frequencies for the thiourea groups in 3PSil-CS$_2$—H are very similar to those found in the spectrum of N,N'-dialkylthioureas obtained by heating alkylammonium alkyldithiocarbamates.[31]

Weight Percent CO$_2$ Uptake:

The temporal course of uptake of (1 atm) CO$_2$ by the polysiloxanes has been followed. Because the uptake rate is dependent on the surface area of the polysiloxanes exposed to the CO$_2$ gas and the rate of stirring, neither of which can be reproduced exactly, no attempt has been made to compare quantitatively rates of uptake by the different PSil polymers. However, the surface area and stirring rate in each run were nearly the same, so that the order of rates among the PSil is known qualitatively. The plateau (saturation) values for uptake are independent of both variables and, therefore, are reproducible quantitatively.

A typical plot for (6-7)PSil is shown in FIG. 6. The other polysiloxanes behaved in an analogous fashion. The uptake was rapid during the first 5 min and reached its maximum, ~130% of the expected amount for complete reaction, after ca. 60 min. The 30% excess is ascribed to physically adsorbed CO$_2$.[32]

Thermally Induced Changes and Stabilities:

Examples of the weight losses from heating 3PSil, 3PSil-CO$_2$, 3PSil-CS$_2$, and 3PSil-CS$_2$—H by TGA are collected in FIG. 7. The difference curve between 3PSil-CO$_2$ and 3PSil shows a 4.0% higher loss at 80° C. from 3PSil-CO$_2$ than from 3PSil; the calculated weight of CO$_2$ in 3PSil-CO$_2$, assuming complete conversion, is ca. 4.0%. We assume that the excess (i.e., physically adsorbed) CO$_2$ is lost over time as the 3PSil-CO$_2$ samples equilibrate with air.

Similarly, heating 3PSil-CS$_2$ results in a 2.8% weight loss at 120° C. This value is close to the 3.1% loss predicted if each of the ammonium dithiocarbamate ion pairs loses one molecule of H$_2$S.[25] As expected, the thiourea-containing polysiloxane, 3PSil-CS$_2$—H, is more stable thermally than its ionically cross-linked analogue, 3PSil-CS$_2$.

Representative DSC thermograms of polysiloxanes are collected in FIGS. 8 and 9. The first-heating thermogram of 15PSil-CO$_2$ includes a broad endotherm that extends from 60 to 120° C. that is attributed to loss of CO$_2$. The first-heating thermogram of 15PSil-CS$_2$ has a broad endotherm from 75 to 150° C. that is in good agreement with the expectation from the TGA results that H$_2$S is being lost. No subsequent exotherms or endotherms were detected during the first cooling or second heating of the sample; conversion of ammonium dithiocarbamate to thiourea is complete after the initial heating.

The isothermal stability of DPAS-15-CO$_2$ was monitored by TGA. The reversion of the ionic to uncharged forms of the polysiloxanes is very slow at 25° C. in the presence of a dry nitrogen gas flow of 60 cm$^3$/min (0.70% weight, corresponding to ~0.16 equiv of CO$_2$, was lost during 60 min) and is even slower in the absence of a wind (0.08% or ~2×10$^{-2}$ equiv of CO$_2$ was lost during 60 min) (FIG. 10b). At 75 or 100° C., 96% of the weight loss calculated for total removal of the CO$_2$ is achieved after less than 5 min with N$_2$ flow (FIG. 10a).

Taken together, these results clearly demonstrate that the PSil-CO$_2$ have good thermal stability at room temperature without nitrogen flow, and good reversibility at elevated temperature with nitrogen flow.

Swelling and Kinetics of Swelling:

The cross-linked PSils can be swollen into gel states by a variety of liquids. As an example, the increase in size of (6-7)PSil-CS$_2$ swelled by hexane is shown in FIG. 11 and the weight increases observed after swelling with a variety of liquids are displayed in FIG. 12. The greater swelling capacity of (6-7)PSil-CS$_2$ than (6-7)PSil-CS$_2$—H is attributed to the ability of the ionic cross-links of the former to "float" from one position to another in a manner that maximizes the network stability in the presence of a liquid; covalent cross-links are "fixed" and, therefore, unable to readjust to the presence of a swelling liquid. Even before swelling, (6-7)PSil-CS$_2$—H is a much stiffer material than (6-7)PSil-CS$_2$. The swelling ratios reported here are larger than those from other cross-linked poly(dimethylsiloxane) gels,[33] probably as a result of the longer side chains in the PSil and the triatomic cross-linkers which leave the 3-D networks more flexible (i.e., the cationic and anionic centers remain paired, but the specific groups constituting the pairs can change with time and degree of swelling).

As mentioned above, the degree of cross-linking can be controlled also by the amount of the triatomic molecule added to the polymer. Thus, 0.4 equivalents of CS$_2$ was added to 15PSil to simulate the degree of cross-linking in fully reacted (6-7)PSil. Under these conditions, swelling ratios in hexane were 330% for 15PSil-0.4CS$_2$ and 250% for 15PSil-0.4CS$_2$—H (i.e., the sample of 15PSil-0.4CS$_2$ that was heated and then swelled). The corresponding (6-7)PSil samples have swelling ratios in hexane, 360% and 280%, that are very near these values. From this observation, we conclude that the ammonium dithiocarbamate cross-links are not affected in an important fashion by the presence of free amino groups on the polymer chains. However, when the nature of the amino groups differs, as they do between (2-4)PSil, in which each side chain contains one primary and one secondary amino group, and 15 PSil, in which each side chain contains only one primary amino group (see FIG. 1), the properties of the partially reacted 15PSil do not match those in which all of the amino groups of (2-4)PSil are thought to be reacted (vide infra).

The kinetics of swelling[34] of these two polysiloxanes by hexane has been investigated as well (FIG. 13).[35] Swelling of (6-7)PSil-CS$_2$ is rapid during the first several minutes and reaches an equilibrium after about 2 h; its rate and its equilibrium value are higher than those of (6-7)PSil-CS$_2$—H. The smaller spaces intrinsically available to hexane molecules between chains in the thiourea-cross-linked polysiloxane networks (vide ante) can account for both observations.

Rheological Properties:

To determine the relationships among amine content, polymer structure, and viscoelastic properties, both static and dynamic rheological studies have been conducted on the polysiloxanes before and after exposing them to one of the triatomic molecules. FIG. 14 displays steady-shear rheological data for the polysiloxanes before and after cross-linking by CO$_2$. Viscosities ($\eta$, Pa·s) are independent of shear rate, as expected of Newtonian liquids.[36] However, $\eta$ increases by ca. 3 orders of magnitude after each PSil is exposed to CO$_2$. The increase in viscosity is especially noticeable in the two polysiloxanes with the highest amino group contents, 10PSil-CO$_2$ and 15PSil-CO$_2$.

The viscosities of the PSil-CO$_2$ increase in a regular fashion with increasing amino group content (FIG. 15). Although there is no apparent relationship between amino group content and the ratio of the PSil-CO$_2$ and PSil viscosities (Table 2), the viscosities of the neat PSil polymers are known to be proportional to their molecular weights.[37] The cross-links within the 3PSil-CO$_2$ network do not result in a true 3-dimensional network—the amino end-groups can extend the lengths of the chains only and, thus, produce 1-dimensional topological networks that can appear to be pseudo-3-dimensional networks if the chains intertwine or their cation-anion pairs aggregate in pairs, providing quadrupolar interactions.

TABLE 2

The viscosities (Pa · s) of samples before (B) and after (A) bubbling CO$_2$ at 25° C.

| Samples | Viscosity (Pa · s) B | A | A/B viscosity ratio |
|---|---|---|---|
| 3PSil | 0.020 | 18 | 900 |
| (2-4)PSil | 0.030 | 48 | 1600 |
| (6-7)PSil | 0.024 | 95 | 4000 |
| 10PSil | 0.067 | 168 | 2500 |
| 15PSil | 0.098 | 290 | 3000 |

The rheological properties of two polysiloxanes containing comparable frequencies of amino groups but one, (2-4)PSil, capable of making 3-D cross-linked networks and the other, 3PSil, capable of making extended 1-D structures with increased molecular weights, have been compared. Addition of CO$_2$ or CS$_2$ increased the viscosities of both (FIG. 16). Also, the stronger attachment of CS$_2$ than CO$_2$ to the amine groups and the greater polarizability of the dithiocarbamate make the viscosity of 3PSil-CS$_2$ higher than that of 3PSil-CO$_2$, but both are less viscous than their (2-4)PSil analogues which can form 3-dimensional cross-linked networks in the presence of one of the triatomic molecules.

The viscosity of the (thiourea-containing) 3PSil-CS$_2$—H, made by heating 3PSil-CS$_2$ to ca. 120° C., is ca. 20× that of its immediate precursor. The large increase can be attributed to the covalent nature of the thiourea links between 3PSil chains and the ability of the thiourea groups to establish strong H-bonding networks.[38,39] The loss modulus G" of this material exceeds the storage modulus G' over the entire range of frequencies examined and is a strong function of frequency (FIG. 17), whereas G' is nearly independent of frequency; G' of all of the polysiloxanes with amino groups on side chains is strongly dependent on frequency (FIG. 18). In addition, the viscoelastic properties of 3PSil-CS$_2$ indicate that this material is like both a viscous liquid and a gel.[40]

However, (2-4)PSil-CS$_2$ exhibits a different rheological behavior from the other polysiloxane samples, whether they are treated with CO$_2$ or CS$_2$ (FIG. 19). Its viscoelastic response can be divided into two regimes: at lower frequencies, G" exceeds G' (a viscous response); at higher frequencies, above the crossing point ($\omega_c$, where the system relaxation time, $t_R$; is ca. $1/\omega c$), G" becomes lower than G' (an elastic response of a transient entangled network[41]). Its steady-shear rheology differs from those of the other CO$_2$- and CS$_2$-treated polysiloxanes as well (FIG. 20): at low angular frequencies, viscosity increases with increasing shear stress (Pa); above the critical shear stress, the viscosity becomes independent of shear stress, as expected for a Newtonian liquid: in behavior typical of viscous liquids, both G' and G" increase with increasing angular frequencies (FIG. 18); these are extremely viscous fluids without gel-like properties.

As mentioned above, partial reaction of 15PSil with CS$_2$ to effect cross-links has a different consequence than that when a polysiloxane with amino groups of a different type and in a different distribution along a chain, such as (2-4)PSil, is completely reacted with CS$_2$. Thus, addition of 0.2 equiv of CS$_2$ to 15PSil, to simulate the frequency of ammonium dithiocarbamate groups in (2-4)PSil-CS$_2$, led to polymers with very different rheological properties (FIG. 21). These results, in combination with those from swelling 15PSil-0.4CS$_2$ (to simulate (6-7)PSil-CS$_2$) demonstrate that the structure of the amino-containing polysiloxane must be considered carefully when attempting to understand the consequences of adding an X=Y=X cross-linker.

According to the dynamic strain sweep measurements in FIG. 22, (6-7)PSil-CS$_2$ is a soft elastic material; G' decreases as shear strain increases. However, G" increases and then decreases in the high-strain region. This behavior, a "weak strain overshoot", arises from the strain-induced imbalance between the formation and destruction of network junctions.[42] If the polysiloxane backbones with ammonium dithiocarbamate groups (as well as those with ammonium carbamate groups) are highly extended as a result of the electrostatic repulsion from the charged centers, the resultant microstructure networks can resist deformation while a weak strain is imposed and G" increases. However, the microstructures are destroyed by large strains, decreasing G".

On the basis of the observations in FIG. 22, the dynamic rheological data for (6-7)PSil-CS$_2$ in FIG. 23, show a gel-like behavior—the storage modulus G' greatly exceeds the loss modulus G" over the entire range of frequencies and both moduli are almost independent of angular frequencies. The lack of frequency dependence indicates that the sample does not relax in the time frame of <100 s. The (6-7)PSil-CS$_2$ swollen by chloroform and ethyl acetate and PSil-CS$_2$—H swollen by hexane also behave rheologically like gels (FIGS. 24 and 25).

Adhesion Tests:

PSil-CO$_2$ samples adhered[43] strongly to several different surfaces. FIG. 26 provides quantitative data for the adhesion to steel as a function of amino group content. Although adhesion is highest for 15PSil-CO$_2$, the dependence on amino group content is not linear. The ability of the PSil-CO$_2$ to adhere to other rigid substrates has been examined only qualitatively as a result of instrumental limitations. The results indicate that the PSil-CO$_2$ have strong adhesive forces to glass in the opening mode (i.e., pulling the plates apart by applying a force perpendicular to the plate surfaces); the forces are weaker for Teflon®, paper, cardboard, and copper, but all are substantial. Adhesion to any of the materials tested was much stronger for the PSil-CO$_2$ than for the corresponding PSil. Adhesion of 15PSil-CO$_2$ even to Teflon® was rather strong.

The qualitative adhesiveness of the PSil-CO$_2$ was evaluated under different environmental conditions. There was no discernible difference in the adhesion of 15PSil-CO$_2$ to copper plates during 24 h when the sandwiched samples were left in air or submerged under tap water. In both cases, the contact surface area of the polymer to the outside environment was very small, conditions that disfavor loss of CO$_2$ via out-diffusion and entry of water via in-diffusion. However, the substrates could be separated much more easily when a sandwich was warmed for several minutes to 40° C. (i.e., below the CO$_2$ loss temperature according to DSC and TGA measurements); recooling the same sandwich to room temperature increased again the adhesive strength.

Acidification Treatment:

It is known that protonation of the carbamate of the dithiocarbamate groups results in a rapid loss of their triatomic moieties and formation of ammonium groups.[21c] When the ammonium carbamate being treated is part of a polymeric material, addition of acid causes a precipitous decrease in viscosity, analogous to that experienced by ammonium carbamates when they are heated to remove CO$_2$.[16c,44] Similarly, decarboxylations of the PSil-CO$_2$ were effected upon application of an acid to their surfaces; the viscosities were reduced and small bubbles (presumably CO$_2$) were formed in the materials when acetic acid (pKa 4.8) was added. However, the PSil-CS$_2$ was converted to flowing liquids only after addition of the stronger trifluoroacetic acid (pKa 0.5).

Procedure for Polysiloxanes Absorbing Oil in Water:

A two layer mixture of oil and water was prepared by adding 0.18 g of motor oil (Drydene Motor Oil) into 0.75 g of water in a screw-cap glass vial. Four polysiloxanes were evaluated: 3-[(2-Aminoethyl)amino]propylmethoxysiloxane-dimethylsiloxane copolymer with 2-4% amino content ((2-4)PSil), 3-aminopropylmethylsiloxane-dimethylsiloxane copolymer with 6-7% amino content ((6-7)PSil); and 3-aminopropylmethylsiloxane-dimethylsiloxane copolymers with 10 and 15% amino groups (10PSil and 15PSil, respectively). The (2-4)PSil and (6-7)PSil were obtained from Gelest, Inc. and the 10PSil and 15PSil were obtained from Dow-Corning Corp. A method of preparing cross-linked amino polysiloxanes was described by Yu et al.[51] A weighed (80 mg) piece of CS$_2$-cross-linked amino-substituted polysiloxane (PSil) was placed into the liquid mixture. The polymers were less dense than water and floated in the oil layer. After 10 min, the polymers swelled in the oil layer and the two-layer mixture of oil and water gradually became a gelatinous mass of polysiloxane over a liquid layer of water. (See FIG. 28) The swelled mass of polysiloxane was removed and weighed. The swelling ratio (S %) of the polysiloxane was calculated from the weights, Wg and Wp, of the swelled and dry polymer, respectively. S %(w/w)=[(Wg−Wp)/Wp]×100%. For 10PSil-CS$_2$, the swelling ratio equals to about 200%. After being placed on a paper towel, the absorbed motor oil slowly diffused out from the glob. After allowing time (at least 1 hr), to ensure PSil has completely deswelled, the recovered PSil can be reused to absorb oil again.

Procedure for Determining Total Swelling Capacity and Selectivity of Swelling in Ethanol-Dichloromethane Mixtures.

Total swelling capacity. In closed screw-cap glass vials, ca. 30 mg of 10PSil-CS$_2$ was added to mixtures of dichloromethane and ethanol (ca 1.0 g in all experiments). The mol % of ethanol was 0% (1.02 g CH$_2$Cl$_2$), 20% (0.88 g CH$_2$Cl$_2$ and 0.12 g ethanol), 40% (0.74 g CH$_2$Cl$_2$ and 0.26 g ethanol), 50% (0.65 g CH$_2$Cl$_2$ and 0.35 g ethanol) to 60% (0.55 g CH$_2$Cl$_2$ and 0.45 g ethanol), 80% (0.32 g CH$_2$Cl$_2$ and 0.68 g ethanol) and 100% (1.05 g ethanol). The swelled polymers were removed after 2 hours by spatula, their surfaces were dried quickly on filter paper, and they were reweighed immediately. The swelling ratios (S %) were calculated by equation 1, where Wg and Wp are the weights of polymer after and before swelling, respectively. The estimated error in the measurements is ±5%.

$$S\%(w/w)=[(Wg-Wp)/Wp]\times 100\% \qquad (1)$$

As shown in FIG. 29, in the 4:6 (mol:mol) CH$_2$Cl$_2$:ethanol mixture, 10PSil-CS$_2$ was swelled to 310% its original weight.

Selective swelling capacity. 33.3 mg of 10PSil-CS$_2$ and an equimolar (0.62 mmoles each) mixture of 0.52 g dichloromethane and 0.29 g ethanol were placed into a closed screw-cap glass vial at room temperature. After 2 hours, the swelled polymer was removed with a spatula and its surface was dried quickly on filter paper and weighed immediately. NMR integration of selective protons (Table 3) was used to calculate the molar ratio of the remaining solvent in the vial and, thereby, the molar ratio of solvents taken into the 10PSil-CS$_2$. The estimated error in the measurements is ±5%.

As shown in Table 3, 10PSil-CS$_2$ takes up 4.2 times as many moles of CH$_2$Cl$_2$ as ethanol from an equimolar mixture of dichloromethane and ethanol. This ratio was calculated by: CH$_2$Cl$_2$:CH$_3$CH$_2$OH=(6.2−4.1):(6.2−5.7)=2.1:0.5=4.2:1.

TABLE 3

Selectivity test of 10PSil-CS$_2$ in a 1:1 (mol:mol) CH$_2$Cl$_2$:CH$_3$CH$_2$OH mixture at room temperature.

| Solvent | 10PSil-CS$_2$ (mg) | CH$_2$Cl$_2$ (g/mmoles) | CH$_3$CH$_2$OH (g/mmoles) | Molar ratio CH$_2$Cl$_2$:CH$_3$CH$_2$OH | S % |
|---|---|---|---|---|---|
| Before adding polymer | 33.3 | 0.52/6.2 | 0.29/6.2 | 1:1 | |

TABLE 3-continued

Selectivity test of 10PSil-CS$_2$ in a 1:1 (mol:mol) CH$_2$Cl$_2$:CH$_3$CH$_2$OH mixture at room temperature.

| Solvent | 10PSil-CS$_2$ (mg) | CH$_2$Cl$_2$ (g/mmoles) | CH$_3$CH$_2$OH (g/mmoles) | Molar ratio CH$_2$Cl$_2$:CH$_3$CH$_2$OH | S % |
|---|---|---|---|---|---|
| After swelling polymer and removing it | 224.8 | 0.35/4.1 | 0.26/5.7 | 1:1.4[a] | 575% |
| In swelled polymer (calculated) | | 0.17/2.1 | 0.03/0.5 | | |

[a]Obtained from $^1$H NMR integration areas of protons (indicated in italics) of CH$_2$Cl$_2$ and CH$_3$CH$_2$OH and correcting for the different populations per molecule.

Procedure for Determining Total Swelling Capacity at Different Temperatures.

A weighed amount (ca. 40 mg) of 10PSil-CS$_2$ was placed in ca. 1.5 g of hexane, chloroform, or THF in a closed screw-cap glass vial. Temperatures were controlled by placing the vial in a water bath, and samples were maintained at targeted temperature for 30 min before weighing the polymer. The swelling ratio was determined by removing the polymer at different temperatures (starting with the lowest temperature noted in FIG. 30), quickly drying it on filter paper, and weighing it. Then, the bath temperature was increased, the polymer was placed anew in the closed vial, and the vial was placed in the bath at the higher temperature for another 30 min. This process was repeated until results at the highest temperature noted in FIG. 2 were achieved. The estimated error in the measurements is ±5%.

Different swelling ratios of 10PSil-CS$_2$ were obtained from 0° C. to 45° C., as shown in FIG. 30. The swelling ratio increases with increasing temperature. For example, 10PSil-CS$_2$ can take up 320 wt % and 405 wt % of hexane, at 0° C. and 45° C., respectively. These results indicate the polysiloxane networks tend to become extended at elevated temperatures, thereby, allowing the uptake of more solvent.

Swelling-Deswelling Description

The swelling and deswelling rates of amino-substituted polysiloxanes in gasoline (I) (87-octane gasoline), naphtha (II) (VM&P VM-46Naphtha) and xylol (III) (Xylol Parts, Inc.) media were investigated. Phase selective swelling of 10PSil-CS$_2$ (ionic cross-linked) is rapid during the first several minutes and reaches an equilibrium after ca. 1 h, as shown in FIGS. 31-33. The swelling ratio (based upon weight gain) before and after swelling is around (I) 205 wt %; (II) 240 wt %; (III) 235 wt %. Under ambient conditions (room temperature in the air), a naphtha-swelled 10PSil-CS$_2$ polymer on a piece of filter paper lost solvent gradually and returned to its original weight in ca. 3 h. Elevating the temperature to 50° C. or placing the naphtha-swelled 10PSil-CS$_2$ polymer under reduced pressure (250 mm Hg) at ambient temperature returned the 10PSil-CS$_2$ to its unswelled weight in ca. 15 min or 45 min, respectively. Furthermore, this swelling/deswelling cycle was repeated 3 times without significant loss of swelling capacity (FIG. 34).

Procedure for Swelling/Deswelling.

A weighed amount (ca. 40 mg) of 10PSil-CS$_2$ polymer was placed in a water and gasoline mixture in a closed screw-cap glass vial. The polymer was removed by spatula, its surface was dried quickly on a piece of filter paper, and it was reweighed immediately. The swelling ratio (S %) was calculated by equation 1, where Wg and Wp are the weights of swelled and dry polymer, respectively.

$$S\%(w/w) = [(Wg-Wp)/Wp] \times 100\% \quad (1)$$

The deswelling process was monitored by removing the polymer from the filter paper at different times, weighing it, and placing it anew on the filter paper until no weight decrease could be detected. The estimated error in the measurements is ±5%.

While exemplary articles and methods have been described in detail with reference to specific embodiments thereof, it will be apparent to those skilled in the art that various changes and modifications can be made, and equivalents employed without departing from the scope of the pending claims.

Each publication, text and literature article/report cited or indicated herein is hereby expressly incorporated by reference in its entirety. In addition, the article "Reversibly Cross-Linking Amino-Polysiloxanes by Simple Triatomic Molecules. Facile Methods for Tuning Thermal, Rheological, and Adhesive Properties" by Tao Yu, Koji Wakuda, Daniel L. Blair and Richard G. Weiss, published in *J. Phys. Chem. C*, 2009, 113 (27), pp 11546-11553, and the books "The Basics of Oil Spill Cleanup", Second Edition, Merv Fingas Ed., CRC Press 2 edition (Sep. 28, 2000), "2010 Ultimate Guide to Oil Spill Cleanup Techniques and Procedures" (Ringbound Book and DVD-ROM), U.S. Government Author, Progressive Management; "Encyclopedia of Oil Spill Cleanup, Response, and Environmental Restoration—Official Guides and Manuals on Containment, Countermeasures, and Cleanup for Coastlines, Marshes, Wildlife" U.S. Government Author, 2010, Progressive Management; "Handbook for oil spill protection and cleanup priorities", Jon D. Byroade (Author), University of Michigan Library (Jan. 1, 1981); and Oil spill cleanup and protection techniques for shorelines and marshlands (Pollution technology review)", Noyes Data Corp (1981) including the supporting documentation, are hereby expressly incorporated by reference in its entirety.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

CITED REFERENCES (1) (a) *Silicon-Based Polymer Science: A comprehensive resource*; Advances in Chemistry Series 224; Zeigler, J. M., Fearon, F. W. G., Eds.; American Chemical Society: Washington, D.C., 1990. (b) Clarson, S. J.; Smith, S. D.; Owen, M. J. *Silicones and Silicone-Modified Materials*; American Chemical Society: Washington, D.C., 2000. (c) Manners, I. *Angew. Chem., Int. Ed.* 1996, 35, 1602-1621. (d) Mark, J. E. *Acc. Chem. Res.* 2004, 37, 946-953.

(2) *Physical Properties of Polymers Handbook,* 2nd ed.; Mark, J. E., Ed.; Springer: Berlin, Germany, 2007. (b) Mark, J. E.; Allcock, H. R.; West, R. *Inorganic Polymers,* 2nd ed.; Oxford University Press: New York, 2005; pp 154-199. (c) Erman, B.; Mark, J. E. *Structures and Properties of Rubberlike Networks;* Oxford University Press: New York, 1997.

(3) Gao, Z.; Nahrup, J. S.; Mark, J. E.; Sakr, A. *J. Appl. Polym. Sci.* 2003, 90, 658-666.

(4) Batra, A.; Cohen, C.; Archer, L. A. *Macromolecules* 2005, 38, 7174-7180.

(5) (a) Kato, D.; Masaike, M.; Majima, T.; Hirata, Y.; Mizutani, F.; Sakata, M.; Hirayama, C.; Kunitake, M. *Chem. Commun.* 2002, 2616, 2617. (b) Park, H. B.; Kim, J. K.; Nam, S. Y.; Lee, Y. M. *J. Membr. Sci.* 2003, 220, 59-73. (c) Miller, A. L., II; Bowden, N. B. *Chem. Commun.* 2007, 20, 2051-2053.

(6) Verma, M. K. S.; Majumder, A.; Ghatak, A. *Langmuir* 2006, 22, 10291-10295.

(7) Oomen, A. G.; Mayer, P.; Tolls, J. *Anal. Chem.* 2000, 72, 2802-2808.

(8) (a) Paul, K. E.; Prentiss, M.; Whitesides, G. M. *Adv. Fund. Mater.* 2003, 13, 259-263. (b) Mcdonald, J. C.; Whitesides, G. M. *Acc. Chem. Res.* 2002, 35, 491-499.

(9) (a) Cho, S. H.; Andersson, H. M.; White, S. R.; Sottos, N. R.; Braun, P. V. *Adv. Mater.* 2006, 18, 997-1000. (b) Wu, D. Y.; Meure, S.; Solomon, D. *Prog. Polym. Sci.* 2008, 33, 479-522.

(10) (a) Abe, Y.; Gunji, T. *Prog. Polym. Sci.* 2004, 29, 149-182. (b) Abbasi, F.; Mirzadeh, H.; Katbab, A. A. *Polym. Int* 2001, 50, 1279-1287.

(11) (a) Zhang, X.; Xie, P.; Shen, Z.; Jiang, J.; Zhu, C.; Li, H.; Zhang, T.; Han, C. C.; Wan, L.; Yan, S.; Zhang, R. B. *Angew. Chem., Int. Ed.* 2006, 45, 3112-3116. (b) Zhou, Q. L.; Yan, S. K.; Han, C. C.; Xie, P.; Zhang, R. B. *Adv. Mater.* 2008, 20, 2970-2976.

(12) (a) Zhang, Z. C.; Sherlock, D.; West, R.; West, R.; Amine, K.; Lyons, L. *J. Macromolecules* 2003, 36, 9176-9180. (b) Ngoumeni-Yappi, R.; Fasel, C.; Riedel, R.; Ischenko, V.; Pippel, E.; Woltersdorf, J.; Clade, J. *Chem. Mater.* 2008, 20, 3601-3608.

(13) Zhang, Y.; Cao, M.; Guo, G. Q.; Sun, J.; Li, Z.; Xie, P.; Zhang, R. B.; Fu, P. F. *J. Mater. Chem.* 2002, 12, 2325-2330.

(14) Nair, K. P.; Breedveld, V.; Weck, M. *Macromolecules* 2008, 41, 3429-3438.

(15) Serpe, M. J.; Craig, S. L. *Langmuir* 2007, 23, 1626-1634.

(16) (a) George, M.; Weiss, R. G. *J. Am. Chem. Soc.* 2001, 123, 10393-10394. (b) George, M.; Weiss, R. G. *Langmuir* 2002, 18, 7124-7135. (c) Carretti, E.; Dei, L.; Baglioni, P.; Weiss, R. G. *J. Am. Chem. Soc.* 2003, 125, 5121-5129.

(17) (a) Yamada, T.; Lukac, P. J.; George, M.; Weiss, R. G. *Chem. Mater.* 2007, 19, 967-969. (b) Yamada, T.; Lukac, P. J.; Yu, T.; Weiss, R. G. *Chem. Mater.* 2007, 19, 4761-4768. (c) Yu, T.; Yamada, T.; Gaviola, C. G.; Weiss, R. G. *Chem. Mater.* 2008, 20, 5337-5344.

(18) (a) Jessop, P. G.; Heldebrant, D. J.; Li, X.; Eckert, C. A.; Liotta, C. L. *Nature* (London) 2005, 436, 1102. (e) Phan, L.; Andreatta, J. R.; Horvey, L. K.; Edie, C. F.; Luco, A.-L.; Mirchandani, A.; Darensbourg, J.; Jessop, P. G. *J. Org. Chem.* 2008, 73, 127-132.

(19) (a) Endo, T.; Nagai, D.; Monma, T.; Yamaguchi, H.; Ochiai, B. *Macromolecules* 2004, 37, 2007-2009. (b) Ochiai, B.; Yokota, K.; Fujii, A.; Nagai, D.; Endo, T. *Macromolecules* 2008, 41, 1229-1236.

(20) (a) Xu, H.; Hampe, E. M.; Rudkevich, D. M. *Chem. Commun.* 2003, 2828-2829. (b) Xu, H.; Rudkevich, D. M. *Chem.-Eur. J.* 2004, 10, 5432-5442. (c) Rudkevich, D. M.; Xu, H. *Chem. Commun.* 2005, 2651-2659.

(21) (a) Hori, Y.; Nagano, Y.; Nakao, J.; Taniguchi, H. *Chem. Express* 1986, 1, 173-176. (b) Hori, Y.; Nagano, Y.; Nakao, J.; Fukuhara, T.; Taniguchi, T. *Chem. Express.* 1986, 1, 224-227. (c) Dell'Amico, D. B.; Calderazzo, F.; Labella, L.; Marchetti, F.; Pampaloni, G. *Chem. Rev.* 2003, 103, 3857-3897.

(22) George, M.; Weiss, R. G. *Langmuir* 2003, 19, 1017-1025.

(23) Laidler, K. J.; Meiser, J. H. *Physical Chemistry,* 3rd ed.; Houghton Mufflin: Boston, Mass., 1999; p 267

(24) DeLassus, P. T.; Whiteman, N. F. In *Polymer Handbook;* Brandrup, J., Immergut, E. H., Grulke, E. A., Eds.; Wiley: New York, 1999; p V/168.

(25) Schroeder, D. C. *Chem. Rev.* 1955, 55, 181-228.

(26) House, H. O. *Modern Synthetic Reaction,* 2nd ed.; W. A. Benjamin: Menlo Park, Calif., 1972; p 2.

(27) Corset, C.; Froment, F. *J. Phys. Chem.* 1990, 94, 6908-6911.

(28) Lobo, H.; Bonilla, J. V. *Handbook of Plastics Analysis;* Marcel Dekker: New York, 2003.

(29) (a) Nakamoto, K.; Fujita, J.; Condrate, R. A.; Morimoto, Y. *J. Chem. Phys.* 1963, 39, 423-427. (b) Gosavi, R. K.; Agarwala, U.; Rao, C. N. R. *J. Am. Chem. Soc.* 1967, 89, 235-239.

(30) Boas, U.; Karlsson, A. J.; de Waal, B. F. M.; Meijer, E. W. *J. Org. Chem.* 2001, 66, 2136-2145.

(31) George, M.; Weiss, R. G. *Langmuir* 2003, 19, 1017-1025.

(32) Guadagno, T.; Kazarian, S. G. *J. Phys. Chem. B* 2004, 108, 13995-13999.

(33) (a) Brennan, D. P.; Dobley, A.; Sideris, P. J.; Oliver, S. R. *Langmuir* 2005, 21, 11994-11998. (b) Favre, E. *Eur. Polym. J.* 1996, 32, 1183-1188.

(34) (a) Sonmez, H. M.; Wudl, F. *Macromolecules* 2005, 38, 1623-1626. (b) Wang, C.; Li, Y.; Hu, Z. *Macromolecules* 1997, 30, 4727-4732.

(35) We have not treated these data according to Fick's[35a,b] second law because the samples employed do not have constant thicknesses. (a) Comyn, *J. Polymer permeability;* Elsevier: London, U.K., 1985. (b) Crank, J. *The Mathematics of Diffusion;* Oxford University Press: Oxford, U.K., 1975.

(36) Khan, S. A.; Royer, J. R.; Raghavan, S. R. *Aviation Fuels with Improved Fire Safety: A Proceeding;* National Academy Press: Washington, D.C., 1997; pp 3146.

(37) Carraher, C. E. *Seymour/Carraher's polymer chemistry,* 7th ed.; CRC Press: Boca Raton, Fla., 2008; pp 4982.

(38) Custelcean, R. *Chem. Commun.* 2008, 295, 307.

(39) (a) Menger, F. M.; Caran, K. L. *J. Am. Chem. Soc.* 2000, 122, 11679-11691. (b) Yabuuchi, K.; Marfo-Owusu, E.; Kato, T. *Org. Biomol. Chem.* 2003, 1, 3464-3469. (c) Perez-Folch, J.; Subirana, J. A.; Aymami, J. *J. Chem. Crystallogr.* 1997, 27, 367-369. (d) Ramanathan, A.; Siakumar, K.; Subramanian, K.; Janarthanan, N.; Ramadas, K.; Fun, H.-K. *Acta Cryatallogr. Sect. C* 1995, 51, 2446-2450.

(40) (a) Ketner, A. M.; Kumar, R.; Davies, T. S.; Elder, P. W.; Raghavan, S. R. *J. Am. Chem. Soc.* 2007, 129, 1553-1559. (b) Tung, S. H.; Huang, Y. E.; Raghavan, S. R. *Langmuir* 2007, 23, 372-376. (c) Tung, S. H.; Huang, Y. E.; Raghavan, S. R. *Soft Matter* 2008, 4, 1086-1093.

(41) (a) Macosko, C. W. *Rheology: Principles, Measurements and Applications;* VCH Publishers: New York, 1994. (b) Winter, H. H.; Chambon, F. *J. Rheol.* 1986, 30, 367-382.

(42) (a) Hyun, K.; Kim, S. H.; Ahn, K. H.; Lee, S. J. *J. Non-Newtonian Fluid Mech.* 2002, 107, 51-65. (b) Sim, H. G.; Ahn, K. H.; Lee, S. J. *J. Non-Newtonian Fluid Mech.* 2003, 112, 237-250.

(43) Veselovskii, R. A. *Adhesion of polymers*; McGraw-Hill: New York, 2002.

(44) Carretti, E; Dei, L; Macherelli, A.; Weiss, R. G. *Langmuir* 2004, 20, 8414-8418.

(45) Khongtong, S.; Ferguson, G. S. *J. Am. Chem. Soc.* 2002, 124, 7254-7255.

(46) These polysiloxanes can be employed as reversible, temperature-dependant adhesives. The substrates strongly adhere at room temperature to the polysiloxanes exposed to $CO_2$, and their adhesive strength can be tuned by changing the temperature.

(47) (a) Carretti, E.; Dei, L.; Weiss, R. G. *Soft Matter* 2005, 1, 17-22. (b) Carretti, E.; Dei, L.; Weiss, R. G.; Baglioni, P. *J. Cult. Heritage* 2008, 9, 386-393.

(48) Chang-Chien, G. P.; Lee, W. S.; Tsai, J. L.; Jeng, S. H. *J. Chromatogr. A* 2001, 932, 97-105.

(49) Freudenberger, J. V.; Spiteller, P.; Bauer, R.; Kessler, H.; Luy, B. *J. Am. Chem. Soc.* 2004, 126, 14690-14691.

(50) (a) Alauzun, J.; Besson, E.; Mehdi, A.; Reye, C.; Corriu, R. J. P. *Chem. Mater.* 2008, 20, 503-513. (b) Soutullo, M. D.; Odom, C. I.; Wicker, B. F.; Henderson, C. N.; Stenson, A. C.; Davis, J. H. *Chem. Mater.* 2007, 19, 3581-3583.

(51) Yu, T.; Wakuda, K.; Blair, D. L.; Weiss, R. G. *J. Phys. Chem. C* 2009, 113, 11546-11553.

What is claimed:

1. A method of manufacturing a polysiloxane composition, the method comprising: (a) forming ionically linked polysiloxane chains by reacting polysiloxane chains having amino functional groups along the chain with carbon disulfide, and (b) heating the ionically linked polysiloxane chains to form polysiloxane chains having amino functional groups along the chain wherein the chains are covalently linked through at least one thiourea bridge.

2. A gel and/or emulsion composition comprising at least one of a crude oil, a petroleum product and a chemical and a polysiloxane composition comprising polysiloxane chains having amino functional groups along the chain wherein the chains are covalently linked through at least one thiourea bridge or ionically linked through an ammonium carbamate or dithiocarbamate bridge, the at least one polysiloxane having up to about 50%, by monomer content, of amino-functional groups.

3. The composition of claim 2, wherein the polysiloxane composition further comprises an addition product of at least one polysiloxane having amino-functional groups along the chain with at least one of carbon dioxide and carbon disulfide.

4. The composition of claim 2, wherein the polysiloxane chains have the formula:

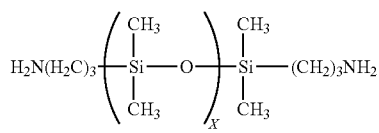

where x is an integer having a value of 1 to about 1,000 or the polysiloxane chains have the formula:

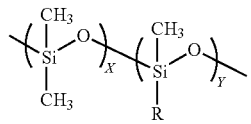

wherein R is a primary alkyl amine or a primary aryl amine, X is an integer from 0 to about 10,000 and Y is an integer from 2 to about 10,000, wherein X+Y=about 50 to about 10,000 and when X is greater than 0, Y/X is greater than or equal to 0.01.

5. A method of containing the release and/or spill of at least one of a crude oil, a petroleum product and a chemical, the method comprising: (a) contacting and/or combining the at least one of the crude oil, the petroleum product and the chemical with a polysiloxane composition comprising polysiloxane chains having amino functional groups along the chain wherein the chains are covalently linked through at least one thiourea bridge or ionically linked through an ammonium carbamate or dithiocarbamate bridge, the at least one polysiloxane having up to about 50%, by monomer content, of amino-functional groups to form a gel and/or emulsion comprising the at least one of the crude oil, the petroleum product and the chemical and the polysiloxane composition; (b) optionally collecting the gel and/or emulsion; and (c) optionally converting the gel and/or emulsion to form at least a first phase comprising predominantly the at least one of the crude oil, the petroleum product and the chemical and a second phase comprising the polysiloxane.

6. The method of claim 5, wherein the polysiloxane chains have the formula:

$$H_2N(H_2C)_3-\left(\begin{array}{c}CH_3\\|\\Si-O\\|\\CH_3\end{array}\right)_x\begin{array}{c}CH_3\\|\\Si-(CH_2)_3NH_2\\|\\CH_3\end{array}$$

where x is an integer having a value of 1 to about 1,000 or the polysiloxane chains have the formula:

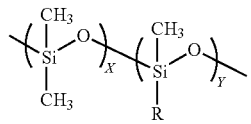

wherein R is a primary alkyl amine or a primary aryl amine, X is an integer from 0 to about 10,000 and Y is an integer from 2 to about 10,000, wherein X+Y=about 50 to about 10,000 and when X is greater than 0, Y/X is greater than or equal to 0.01.

7. The method of claim 5, wherein the polysiloxane composition comprises an addition product of at least one polysiloxane having amino-functional groups along the chain with at least one of carbon dioxide and carbon disulfide.

8. A system for containing and/or remediating a spill and/or release of at least one of a crude oil, a petroleum product and a chemical into the environment, the system comprising: (a) a polysiloxane composition comprising polysiloxane chains having amino functional groups along the chain wherein the chains are covalently linked through at least one thiourea bridge or ionically linked through an ammonium carbamate or dithiocarbamate bridge; the polysiloxane having up to about 50%, by monomer content, of amino-functional groups; (b) a means for contacting and/or combining the polysiloxane composition with the at least one of the crude oil, the petroleum product and the chemical, (c) optionally a means for collecting a gel and/or emulsion or composition formed upon contact of the polysiloxane composition with the at least one of the crude oil, the petroleum product and the chemical; (d) optionally a means for separating the gel and/or emulsion or composition comprising the polysiloxane composition and the at least one of the crude oil, the petroleum product and the chemical into a first phase comprising predominantly the at least one of the crude oil, the petroleum product and the chemical and a second phase comprising the polysiloxane; and (e) optionally a means for collecting at least one of the first phase and the second phase.

9. The system of claim 8, wherein the polysiloxane composition further comprises an addition product of at least one polysiloxane having amino-functional groups along the chain with at least one of carbon dioxide and carbon disulfide.

10. The system of claim 8, wherein the polysiloxane chains have the formula:

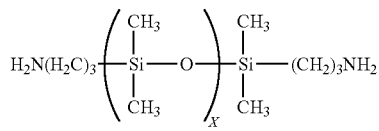

where x is an integer having a value of 1 to about 1,000 or the polysiloxane chains have the formula:

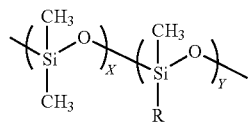

wherein R is a primary alkyl amine or a primary aryl amine, X is an integer from 0 to about 10,000 and Y is an integer from 2 to about 10,000, wherein X+Y=about 50 to about 10,000 and when X is greater than 0, Y/X is greater than or equal to 0.01.

11. The system of claim 10, wherein R is —$CH_2$—$CH_2$—$CH_2$—$NH_2$ or —$CH_2$—$CH_2$—NH—$CH_2$—$CH_2$—$CH_2$—$NH_2$.

12. The system of claim 8, wherein the means for contacting and/or combining the polysiloxane composition with the at least one of the crude oil, the petroleum product and the chemical applies the polysiloxane composition onto or into the at least one of the crude oil, the petroleum product and the chemical to be contained or remediated and/or onto or into water which is, or may become, in contact with the at least one of the crude oil, the petroleum product and the chemical to be contained or remediated.

13. The system of claim 8, wherein the optional means for collecting the gel and/or emulsion or composition formed upon contact of the polysiloxane composition with the at least one of the crude oil, the petroleum product and the chemical.

14. The system of claim 8, wherein the optional means for separating the gel and/or emulsion or composition comprising the polysiloxane composition and the at least one of the crude oil, the petroleum product and the chemical into a first phase comprising predominantly the at least one of the crude oil, the petroleum product and the chemical and a second phase comprising the polysiloxane comprises placing a mixture comprising the first phase and the second phase in a vessel and removing at least one of the phases from the vessel.

15. A method of manufacturing a reversible adhesive, said method comprising forming an addition product of at least one polysiloxane having amino-functional groups along the chain with at least one of carbon dioxide and carbon disulfide or an ionic linkage between at least two polysiloxanes through an ammonium carbamate or dithiocarbamate bridge, said at least one polysiloxane having up to about 50%, by monomer content, of amino-functional groups.

16. A method of reversibly connecting at least a first and a second material, said method comprising: (a) connecting said at least first and second materials by applying a first reversible adhesive composition to at least said first material; (b) bringing the first reversible adhesive composition into contact with at least one of said second material and a second reversible adhesive composition applied to said second material, wherein the first and second materials are the same or different and said first and second reversible adhesive compositions are the same or different; and (c) disconnecting said first and second materials by: (1) heating the connected first and second materials, when at least one of the first and second reversible adhesive compositions is made using an addition product formed with carbon dioxide; or (2) exposing the connected first and second materials to an acid, wherein the first and second reversible adhesive compositions comprise (a) an addition product of at least one polysiloxane having amino-functional groups along the chain with at least one of carbon dioxide and carbon disulfide, or (b) polysiloxane chains having ammonium functional groups along the chain and polysiloxane chains having carbamate or dithiocarbamate functional groups along the chain, said at least one polysiloxane having up to about 50%, by monomer content, of amino-functional groups, wherein when the first and second reversible adhesive compositions are linked by an ionic linkage between at least two polysiloxanes through an ammonium carbamate or dithiocarbamate bridge, step (c) comprises step (2).

17. A method for the selective separation of a lipophilic material from a hydrophilic material, the method comprising: (a) contacting and/or combining a mixture comprising a lipophilic and a hydrophilic material with a polysiloxane composition comprising polysiloxane chains having amino functional groups along the chain wherein the chains are covalently linked through at least one thiourea bridge or through an ionic linkage between at least two polysiloxanes through an ammonium carbamate or dithiocarbamate bridge, the at least one polysiloxane having up to about 50%, by monomer content, of amino-functional groups to form a gel and/or emulsion comprising the lipophilic material and the chemical and the polysiloxane composition. (b) separating the gel and/or emulsion from the hydrophilic material and collecting the gel and/or emulsion; and (c) converting the gel and/or emulsion to form at a least first phase comprising predominantly the lipophilic material and the chemical and a second phase comprising the polysiloxane.

* * * * *